(12) United States Patent
Shitara et al.

(10) Patent No.: US 8,284,731 B2
(45) Date of Patent: Oct. 9, 2012

(54) COMMUNICATION TERMINAL APPARATUS, COMMUNICATION CONTROL APPARATUS, WIRELESS COMMUNICATION SYSTEM, AND COMMUNICATION METHOD ALL USING A PLURALITY OF SLOTS

(75) Inventors: Shoichi Shitara, Ichihara (JP); Toshizo Nogami, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 979 days.

(21) Appl. No.: 12/067,919

(22) PCT Filed: Sep. 26, 2006

(86) PCT No.: PCT/JP2006/319026
§ 371 (c)(1),
(2), (4) Date: Mar. 24, 2008

(87) PCT Pub. No.: WO2007/037218
PCT Pub. Date: Apr. 5, 2007

(65) Prior Publication Data
US 2009/0046652 A1    Feb. 19, 2009

(30) Foreign Application Priority Data

Sep. 27, 2005 (JP) ................... 2005-280694

(51) Int. Cl.
*H04W 4/00* (2009.01)

(52) U.S. Cl. ........ 370/330; 370/436; 370/478; 370/480; 370/332; 455/67.13; 455/135; 455/161.3; 455/277.2; 455/150.1

(58) Field of Classification Search .................. 370/330, 370/436, 478, 480, 332; 455/67.13, 135, 455/161.3, 277.2, 150.1
See application file for complete search history.

(56) References Cited

U.S. PATENT DOCUMENTS 6,366,763 B1  4/2002  Ue et al.
7,379,492 B2  5/2008  Hwang
7,386,277 B2  6/2008  Cho et al.
(Continued)

FOREIGN PATENT DOCUMENTS

CN  1433228 A  7/2003
(Continued)

OTHER PUBLICATIONS

NTT DoCoMo "3GPP R1-050590 Physical Channels and Multiplexing in Evolved UTRA Downlink" Jun. 16, 2005, pp. 6-11.
(Continued)

*Primary Examiner* — Derrick Ferris
*Assistant Examiner* — Abdelnabi Musa
(74) *Attorney, Agent, or Firm* — Birch, Stewart, Kolasch & Birch, LLP

(57) ABSTRACT

To provide a communication terminal apparatus that efficiently transmits feedback on information regarding the reception quality and transmission form to a communication control apparatus. A communication terminal apparatus (200) has a terminal-side receiving section (218) that receives control information from a communication control apparatus, a reception quality measuring section (214) that measures reception quality of a plurality of slots, a transmission form selecting section (215) that selects a single transmission form from among a plurality of transmission forms to assign data to the plurality of slots based on a measurement result of measured reception quality, a feedback information generating section (216) that generates feedback information for notifying reception quality information indicating the reception quality in a plurality of slots and transmission form information for designating a selected transmission form, and a terminal-side transmitting section (217) that transmits the generated feedback information to the communication control apparatus.

26 Claims, 9 Drawing Sheets

U.S. PATENT DOCUMENTS

| | | | |
|---|---|---|---|
| 2003/0063587 A1 | 4/2003 | Cho et al. | |
| 2003/0231706 A1 | 12/2003 | Hwang | |
| 2005/0128976 A1 | 6/2005 | Uehara et al. | |
| 2006/0153061 A1* | 7/2006 | Nishio | 370/208 |
| 2010/0195707 A1* | 8/2010 | Duan et al. | 375/227 |

FOREIGN PATENT DOCUMENTS

| | | |
|---|---|---|
| EP | 1 289 181 A1 | 3/2003 |
| EP | 1 424 869 A1 | 6/2004 |
| JP | 2002-218526 A | 8/2002 |
| JP | 2003-23659 A | 1/2003 |
| JP | 2006-148220 A | 6/2006 |

OTHER PUBLICATIONS

Samsung. Physical Channel Structure and Procedure for EUTRA Downlink, 3GPP TSG-RAN WG1 Meeting #42, Aug. 29, 2005, R1-050884, URL, http://www.3gpp.org/ftp/tsg_ran/wg1_rl1/TSGR1/Doca/R1-050884.zip.

European Search Report issued in European Patent Application No. 06810551.9 on Dec. 27, 2011.

* cited by examiner

COMMUNICATION TERMINAL APPARATUS, COMMUNICATION CONTROL APPARATUS, WIRELESS COMMUNICATION SYSTEM, AND COMMUNICATION METHOD ALL USING A PLURALITY OF SLOTS

TECHNICAL FIELD

The present invention relates to a wireless communication system for selecting a transmission form corresponding to reception quality to perform communications in a multicarrier communication scheme.

BACKGROUND ART

Conventionally, in mobile communication systems, communications have been performed in multiple access schemes where a plurality of mobile stations is simultaneously connected to a single base station in a cell to perform radio communications. In recent years, more increases in speed and capacity in data communications have been demanded in such multiple access schemes, and studies in this field have actively been performed.

As one of methods of achieving increases incapacity, considered is efficient packet scheduling in the base station. As one of such methods, proposed is a method of scheduling packets efficiently based on information of propagation path conditions from each mobile station. In High Speed Downlink Packet Access (HSDPA) in the W-CDMA (Wideband Code Division Multiple Access) mobile communication system, such a method has been proposed that the mobile station reports CQI (Channel Quality Indicator) that is propagation path condition information of downlink radio communication to the base station, and that the base station performs scheduling of packets based on the CQI reported from each mobile station.

Currently, 3GPP (3rd Generation Partnership Project) has studies one-cell reuse OFDM(TDMA,FDMA) (Orthogonal Frequency Division Multiplex/Time Division Multiple Access, Frequency Division Multiple Access) communication schemes by adopting the OFDM (Orthogonal Frequency Division Multiplex) communication scheme that is one of multicarrier communication schemes in the downlink radio communication scheme in order to develop a standard of the next-generation communication system. This communication scheme is of technique where in a multi-cell environment comprised of a plurality of cells, communications are performed using the same frequencies in all the cells, and in communicating, the modulation scheme is OFDM, while TDMA/FDMA is used as the access scheme.

OFDM, TDMA and FDMA will briefly be described below which are elemental techniques of the OFDM/(TDMA, FDMA) communication scheme.

First, the OFDM communication scheme is a scheme adopted also in the 5 GHz-band wireless LAN (Local Area Network) system, where tens to thousands of carries are allocated at minimum frequency intervals that do not cause interference in theory to enable simultaneous communications. Generally, in the OFDM communication scheme, this carrier is referred to as a subcarrier, and each subcarrier is modulated with a modulation scheme such as QPSK (Quadrature Phase Shift keying), 16QAM (Quadrature Amplitude Modulation), 64QAM or the like to perform communications.

Next, the TDMA communication scheme is a scheme where in transmitting and receiving the data, the time is divided and each mobile station performs radio communications. Generally, in the communication system using TDMA in the access scheme, used is a frame structure having a plurality of slots each of which is a unit time to communicate.

Next, the FDMA communication scheme is a scheme where frequencies are divided for accesses in transmitting and receiving the data. Generally, in the communication system using FDMA in the access scheme, frequencies are divided into some bands to separate frequency bands to gain access, and the scheme thereby distinguishes between mobile stations that perform radio communications.

Next, an explanation is given about OFDM/(TDMA, FDMA) based on the aforementioned introductory descriptions. FIG. 10 is a diagram showing an example of a two-dimensional frame structure of OFDM/(TDMA, FDMA). In FIG. 10, the vertical axis represents the frequency, and the horizontal axis represents the time. A single rectangle is a minimum unit used in data transmission, and in this description, referred to as a slot, while a plurality of slots periodically arranged is referred to as a frame. The slot is comprised of a plurality of OFDM symbols.

FIG. 10 shows an example of the structure of a downlink communication frame, and the frame is comprised of nine slots in the time-axis direction and twelve slots in the frequency-axis direction. When a base station performs radio data communications to mobile stations, the base station is capable of allocating slots forming a frame to respective different mobile stations to transmit data, or also capable of allocating all the slots to a single mobile station to perform radio communications.

Non-patent Document 1 shows the OFDM communication scheme proposed by 3GPP. Such a communication method is studied in Non-patent Document 1 that as a downlink transmission form, one communication zone with slots divided in the frequency direction and the time direction is used efficiently by a plurality of mobile stations to enhance communication efficiency of the entire cell. Proposed as the downlink radio communication scheme are a communication method for combining a plurality of modulation schemes, coding rates and spreading ratios, allocating each slot to a mobile station with good propagation path conditions by a scheme corresponding to propagation path conditions of each mobile station to perform radio communications, and obtaining the multi-user diversity effect to enhance throughput of the entire cell, and another method for using the whole or part of frequency bandwidth when propagation path conditions deteriorate or the moving speed of a mobile station is fast, using subcarriers of a higher number of frequency bands, and thereby obtaining the effect tolerant to fading i.e. frequency diversity effect.

Non-patent Document 1: NTT DoCoMo "3GPP R1-050590 Physical Channels and Multiplexing in Evolved UTRA Downlink" Jun. 16, 2005, p. 6-11

DISCLOSURE OF INVENTION

Problems to be Solved by the Invention

Also in the communication method to obtain the multi-user diversity effect and the communication method to obtain the frequency diversity effect as described in Non-patent Document 1, as in HSDPA, each communication terminal apparatus (mobile station) transmits propagation path conditions as feedback, and the communication control apparatus (base station) performs scheduling. However, specific proposals have not been made on a feedback method of propagation path conditions to efficiently switch among a plurality of communication schemes, transmission method and scheduling method in the communication control apparatus, and the like. To perform radio communications while switching among a plurality of communication methods to use as described in Non-patent Document 1, expected are increases in feedback data amount of propagation path conditions of each slot from each communication terminal apparatus, increases in data processing amount of the feedback data from each communication terminal apparatus in the communication control apparatus, delay in processing time, and the like, and required are communication procedures enabling the processing to be performed with efficiency at high speed, feedback data form, and communication terminal apparatus and communication control apparatus to achieve such procedures and form.

The present invention is carried out in view of the such circumstances, and it is an object of the invention to provide a communication terminal apparatus that efficiently transmits feedback to a communication control apparatus on information regarding reception quality and transmission form to efficiently switch among a plurality of communication schemes, the communication control apparatus that switches the transmission form based on the feedback information to transmit data to the communication terminal apparatus, and a wireless communication system and communication method using these techniques.

Means for Solving the Problem (1) An aspect of a communication terminal apparatus according to the invention is a communication terminal apparatus that communicates with a communication control apparatus using a plurality of slots each specified by one or more time channels each defined by a predetermined time length, and one or more frequency channels each defined by a predetermined frequency band, and is characterized by having a terminal-side receiving section that receives control information from the communication control apparatus, a reception quality measuring section that measures reception quality of a plurality of slots using the received control information, a transmission form selecting section that selects a single transmission form from among a plurality of transmission forms to assign data to the plurality of slots, based on a measurement result of measured reception quality, a feedback information generating section that generates feedback information for notifying the communication control apparatus of reception quality information indicating the reception quality in a plurality of slots and transmission form information for designating a selected transmission form, and a terminal-side transmitting section that transmits the generated feedback information to the communication control apparatus, where the terminal-side receiving section receives data of the transmission form designated in the transmission form information from the communication control apparatus.

Thus, according to one aspect of the communication terminal apparatus according to the invention, each communication terminal apparatus measures the reception quality, and is capable of notifying the transmission form information to designate a suitable transmission form in transmitting feedback on the measured reception quality to the communication control apparatus. Each communication control apparatus is thereby capable of selecting a suitable transmission form for the communication terminal apparatus. Further, each communication terminal apparatus determines a transmission form of data to be transmitted from the communication control apparatus, and is thereby capable of reducing the processing of the communication control apparatus. Furthermore, since the feedback information transmitted from each communication terminal apparatus does not need to always include all the propagation path conditions, it is also possible to reduce transmission power of the communication terminal apparatus. The information of the suitable transmission form is transmitted from each communication terminal apparatus as feedback, and the communication control apparatus is thereby capable of performing more efficient data assignments.

(2) Further, in one aspect of the communication terminal apparatus according to the invention, the feedback information generating section is characterized by setting a plurality of different data forms corresponding to the plurality of transmission forms, selecting a data form corresponding to the selected transmission form, editing the measurement result of measured reception quality into the selected data form to generate the reception quality information, and using the generated reception quality information as the feedback information.

Thus, the feedback information generating section is capable of notifying the communication control apparatus of the transmission form selected on the communication terminal apparatus side by the data form of the reception quality information. By this means, the communication control apparatus is capable of assigning the transmission data with the transmission form selected by the communication terminal apparatus, and acquiring the reception quality information required to generate the transmission data.

(3) Furthermore, in one aspect of the communication terminal apparatus according to the invention, the feedback information generating section is characterized by calculating an average measurement result obtained by averaging measurement results of reception quality of a plurality of slots, using the calculated average measurement result as the feedback information, and thereby generating the feedback information for notifying the reception quality information and the transmission form information for designating a first transmission form.

Thus, the feedback information generating section is capable of notifying the communication control apparatus of the reception quality and the transmission form using an average value of the measurement results of reception quality.

(4) In one aspect of the communication terminal apparatus according to the invention, the feedback information generating section is characterized by using respective measurement results of reception quality of a plurality of slots as the feedback information, and thereby generating the feedback information for notifying the reception quality information and the transmission form information for designating a second transmission form.

Thus, the feedback information generating section uses a measurement result of reception quality of each slot as the feedback information, and is thereby capable of notifying the communication control apparatus of the reception quality and the transmission form.

(5) In one aspect of the communication terminal apparatus according to the invention, the feedback information generating section is characterized by generating the reception quality information based on the measurement result of measured reception quality, and generating the feedback information including the generated reception quality information and the transmission form information.

Thus, the feedback information generating section generates the feedback information with the transmission form information for designating a transmission form added to the reception quality information, and is thereby capable of notifying the communication control apparatus of the reception quality and the transmission form.

(6) In one aspect of the communication terminal apparatus according to the invention, it is a feature that the terminal-side receiving section receives the control information including feedback request information for designating a slot, the reception quality measuring section measures the reception quality of the slot designated in the feedback request information, and that the feedback information generating section generates the reception quality information based on the measurement result of reception quality of the designated slot.

Thus, the reception quality measuring section measures the reception quality on the slot designated from the communication control apparatus, and it is thereby possible to notify the reception quality of the slot in response to the request from the communication control apparatus.

(7) In one aspect of the communication terminal apparatus according to the invention, it is another feature that the reception quality measuring section selects a predetermined number of slots from among a plurality of slots as feedback slots, and measures the reception quality of selected feedback slots, and that the feedback information generating section generates the reception quality information based on measurement results of the reception quality of the feedback slots.

Thus, the reception quality measuring section is capable of measuring the reception quality while limiting the number of slots, and reducing the load.

(8) In one aspect of the communication terminal apparatus according to the invention, it is another feature that the reception quality measuring section selects a predetermined number of slots from measurement results of measured reception quality of a plurality of slots as feedback slots, the transmission form selecting section selects a single transmission form from among a plurality of transmission forms based on the measurement results of reception quality of the selected feedback slots, and that the feedback information generating section generates the reception quality information based on the measurement results of reception quality of the feedback slots.

Thus, the transmission form selecting section and the feedback information generating section are capable of performing the processing based on the reception quality information in slots selected from among a plurality of slots. It is thereby possible to reduce loads of the processing.

(9) In one aspect of the communication terminal apparatus according to the invention, the reception quality measuring section is characterized by selecting a predetermined number of slots in descending order of excellence of the reception quality as feedback slots.

Thus, according to the reception quality measuring section, it is possible to select slots with good reception quality to notify the communication control apparatus. By this means, the communication control apparatus is capable of performing the processing on the slots with good reception quality, and thus performing efficient scheduling.

(10) In one aspect of the communication terminal apparatus according to the invention, the reception quality measuring section is characterized by selecting a predetermined number of slots in descending order of excellence of the reception quality, and further selecting a predetermined number of slots in ascending order of excellence of the reception quality, as feedback slots.

Thus, according to the reception quality measuring section, it is possible to notify the communication control apparatus of slots with poor reception quality, as well as slots with good reception quality. By this means, the communication control apparatus is capable of grasping fluctuations in reception quality.

(11) In one aspect of the communication terminal apparatus according to the invention, the reception quality measuring section is characterized by using at least one of propagation path quality calculated from reception signal power and carrier signal power, and reception data quality calculated from an error amount of the reception data.

Thus, the reception quality measuring section is capable of using either the propagation path conditions or the reception data quality as the reception quality.

(12) In one aspect of the communication terminal apparatus according to the invention, the reception quality measuring section is characterized by measuring the reception quality of the same slot at a plurality of points in time, and determining moving speed of the communication terminal apparatus based on the measured reception quality at the plurality of points in time.

Thus, the reception quality measuring section is capable of judging the reception quality while considering the moving speed.

(13) In one aspect of the communication terminal according to the invention, it is another feature that the plurality of transmission forms includes at least one of a multi-user diversity scheme for assigning communication terminal apparatuses with good propagation path conditions for each slot, and a frequency diversity scheme for using a plurality of slots in the frequency direction and transmitting to obtain the diversity effect.

Thus, by suitably switching between a plurality of transmission forms having different characteristics, it is possible to carry out efficient communications.

(14) In an aspect of a communication control apparatus according to the invention, the communication control apparatus communicates with a plurality of communication terminal apparatuses using a plurality of transmission forms for assigning data to a plurality of slots each specified by one or more time channels each defined by a predetermined time length, and one or more frequency channels each defined by a predetermined frequency band, and is characterized by having a control-side transmitting section that transmits control information to the communication terminal apparatuses, a control-side receiving section that receives feedback information for notifying reception quality information indicating reception quality and transmission form information for designating a single transmission form among the plurality of transmission forms in response to the control information, a transmission form determining section that selects a transmission form to apply to the communication terminal apparatuses based on the received feedback information, and a data assigning section that assigns data of which transmission destinations are the communication terminal apparatuses to respective slots based on the selected transmission form and the reception quality information, where the control-side transmitting section transmits the data of which transmission destinations are the communication terminal apparatuses assigned to respective slots, using the selected transmission form.

Thus, according to one aspect of the communication control apparatus according to the invention, each communication terminal apparatus notifies the transmission form information for designating a suitable transmission form in transmitting feedback on the reception quality, and it is thereby possible to generate transmission data based on the notified transmission form. Further, each communication terminal apparatus determines the transmission form of data to be transmitted from the communication control apparatus, and is thereby capable of reducing the processing of the communication control apparatus. Since each communication terminal apparatus transmits the feedback on the information of the suitable transmission form, the communication control apparatus is capable of performing more efficient data assignments.

(15) Further, in one aspect of the communication control apparatus according to the invention, it is a feature that the control-side receiving section receives the reception quality information edited using one of a plurality of different data forms as feedback information, and that the transmission form determining section selects a single transmission form from among the plurality of transmission forms based on the data form indicated by the reception quality information.

Thus, the transmission form determining section is capable of determining the transmission form by the data form of the reception quality information.

(16) Furthermore, in one aspect of the communication control apparatus according to the invention, the transmission form determining section is characterized by selecting a first transmission form when the reception quality information is an average measurement result obtained by averaging measurement results of reception quality of a plurality of slots.

Thus, the transmission form determining section is capable of determining the transmission form by the data form of the reception quality information, while acquiring the reception quality information required for generation of the transmission data.

(17) In one aspect of the communication control apparatus according to the invention, the transmission form determining section is characterized by selecting a second transmission form when the reception quality information is respective measurement results of reception quality of a plurality of slots.

Thus, the transmission form determining section is capable of determining the transmission form by the data form of the reception quality information, while acquiring the reception quality information required for generation of the transmission data.

(18) In one aspect of the communication control apparatus according to the invention, it is a feature that the control-side receiving section receives feedback information including the transmission form information for designating one of the plurality of transmission forms, and that the transmission form determining section selects a single transmission form from among the plurality of transmission forms based on the transmission form information included in the feedback information.

Thus, the transmission form determining section is capable of determining the transmission form by the transmission form information added to the reception quality information.

(19) In one aspect of the communication control apparatus according to the invention, it is a feature that the control-side transmitting section transmits the control information including feedback request information for designating a slot position to request measurement of the reception quality, the control-side receiving receives the feedback information for notifying the reception quality information in the slot position designated in the feedback request information and the transmission form information, and that the data assigning section assigns data of which transmission destinations are the communication terminal apparatuses to respective slots based on the reception quality information in the designated slot position and the selected transmission form.

Thus, the data assigning section is capable of assigning slots based on the reception quality information of the slot requested on the communication control apparatus side. It is thereby possible to perform scheduling with efficiency.

(20) In one aspect of the communication control apparatus according to the invention, it is a feature that the control-side receiving section receives feedback information for notifying the reception quality information in selected feedback slots such that each of the communication terminal apparatuses selects a predetermined number of slots from among a plurality of slots as feedback slots and the transmission form information, and that the data assigning section assigns data of which transmission destinations are the communication terminal apparatuses to respective slots based on the reception quality information in the feedback slots and the selected transmission form.

Thus, the data assigning section is capable of assigning slots based on the reception quality information of the feedback slots selected on the communication terminal apparatus side. It is thereby possible to carry out efficient scheduling.

(21) In one aspect of the communication control apparatus according to the invention, it is another feature that the plurality of transmission forms includes at least one of a multi-user diversity scheme for assigning communication terminal apparatuses with good propagation path conditions for each slot, and a frequency diversity scheme for using a plurality of slots in the frequency direction and transmitting to obtain the diversity effect.

Thus, by suitably switching between a plurality of transmission forms having different characteristics, it is possible to carry out efficient communications.

(22) An aspect of a wireless communication system according to the invention is a wireless communication system in which a communication control apparatus communicates with a communication terminal apparatus using a plurality of slots each specified by one or more time channels each defined by a predetermined time length, and one or more frequency channels each defined by a predetermined frequency band, and is characterized in that the communication terminal apparatus has a terminal-side receiving section that receives control information from the communication control apparatus, a reception quality measuring section that measures reception quality of a plurality of slots using the received control information, a transmission form selecting section that selects a single transmission form from among a plurality of transmission forms to assign data to the plurality of slots based on a measurement result of measured reception quality, a feedback information generating section that generates feedback information for notifying the communication control apparatus of reception quality information indicating the reception quality in a plurality of slots and transmission form information for designating a selected transmission form, and a terminal-side transmitting section that transmits the generated feedback information to the communication control apparatus, and that the communication control apparatus has a control-side transmitting section that transmits the control information to the communication terminal apparatus, a control-side receiving section that receives the feedback information from the communication terminal apparatus in response to the control information, a transmission form determining section that selects a transmission form to apply to the communication terminal apparatus based on the received feedback information, and a data assigning section that assigns data of which transmission destination is the communication terminal apparatus to each slot based on the selected transmission form and the reception quality information, where the control-side transmitting section transmits the data of which transmission destination is each communication terminal apparatus assigned to each slot using the selected transmission form, and the terminal-side receiving section receives the data of the transmission form designated in the transmission form information from the communication control apparatus.

Thus, according to one aspect of the wireless communication system according to the invention, each communication terminal apparatus measures the reception quality, and is capable of notifying the transmission form information to designate a suitable transmission form in transmitting feedback on the measured reception quality to the communication control apparatus. Each communication control apparatus is thereby capable of selecting a suitable transmission form for the communication terminal apparatus. Further, each communication terminal apparatus determines a transmission form of data to be transmitted from the communication control apparatus, and is thereby capable of reducing the processing of the communication control apparatus. Furthermore, since the feedback information transmitted from each communication terminal apparatus does not need to always include all the propagation path conditions, it is also possible to reduce transmission power of the communication terminal apparatus. The information of the suitable transmission form is transmitted from each communication terminal apparatus as feedback, and the communication control apparatus is thereby capable of performing more efficient data assignments.

(23) An aspect of a communication method according to the invention is a communication method of a communication terminal apparatus that communicates with a communication control apparatus using a plurality of slots each specified by one or more time channels each defined by a predetermined time length, and one or more frequency channels each defined by a predetermined frequency band, and is characterized by receiving control information from the communication control apparatus, measuring reception quality of a plurality of slots using the received control information, selecting a single transmission form from among a plurality of transmission forms to assign data to the plurality of slots based on a measurement result of measured reception quality, generating feedback information for notifying the communication control apparatus of reception quality information indicating the reception quality in a plurality of slots and transmission form information for designating a selected transmission form, transmitting the generated feedback information to the communication control apparatus, and receiving data of the transmission form designated in the transmission form information from the communication control apparatus.

Thus, according to one aspect of the communication method according to the invention, each communication terminal apparatus measures the reception quality, and is capable of notifying the transmission form information to designate a suitable transmission form in transmitting feedback on the measured reception quality to the communication control apparatus. Each communication control apparatus is thereby capable of selecting a suitable transmission form for the communication terminal apparatus. Further, each communication terminal apparatus determines a transmission form of data to be transmitted from the communication control apparatus, and is thereby capable of reducing the processing of the communication control apparatus. Furthermore, since the feedback information transmitted from each communication terminal apparatus does not need to always include all the propagation path conditions, it is also possible to reduce transmission power of the communication terminal apparatus. The information of the suitable transmission form is transmitted from each communication terminal apparatus as feedback, and the communication control apparatus is thereby capable of performing more efficient data assignments.

(24) An aspect of a communication method according to the invention is a communication method of a communication control apparatus that communicates with a plurality of communication terminal apparatuses using a plurality of transmission forms for assigning data to a plurality of slots each specified by one or more time channels each defined by a predetermined time length, and one or more frequency channels each defined by a predetermined frequency band, and is characterized by transmitting control information to the communication terminal apparatuses, receiving feedback information for notifying reception quality information indicating reception quality and transmission form information for designating a single transmission form among the plurality of transmission forms in response to the control information, selecting a transmission form to apply to the communication terminal apparatuses based on the received feedback information, assigning data of which transmission destinations are the communication terminal apparatuses to respective slots based on the selected transmission form and the reception quality information, and transmitting the data of which transmission destinations are the communication terminal apparatuses assigned to respective slots, using the selected transmission form.

Thus, according to one aspect of the communication method according to the invention, each communication terminal apparatus notifies the transmission form information for designating a suitable transmission form in transmitting feedback on the reception quality, and it is thereby possible to generate transmission data based on the notified transmission form. Further, each communication terminal apparatus determines the transmission form of data to be transmitted from the communication control apparatus, and it is thereby possible to reduce the processing of the communication control apparatus. Since each communication terminal apparatus transmits the feedback on the information of the suitable transmission form, the communication control apparatus is capable of performing more efficient data assignments.

(25) An aspect of a communication method according to the invention is a communication method in a wireless communication system in which a communication control apparatus communicates with a communication terminal apparatus using a plurality of slots each specified by one or more time channels each defined by a predetermined time length, and one or more frequency channels each defined by a predetermined frequency band, and is characterized in that the communication terminal apparatus receives control information from the communication control apparatus, measures reception quality of a plurality of slots using the received control information, selects a single transmission form from among a plurality of transmission forms to assign data to the plurality of slots based on a measurement result of measured reception quality, generates feedback information for notifying the communication control apparatus of reception quality information indicating the reception quality in a plurality of slots and transmission form information for designating a selected transmission form, and transmits the generated feedback information to the communication control apparatus, and that the communication control apparatus transmits the control information to the communication terminal apparatus, receives the feedback information from the communication terminal apparatus in response to the control information, selects a transmission form to apply to the communication terminal apparatus based on the received feedback information, and assigns data of which transmission destination is the communication terminal apparatus to each slot based on the selected transmission form and the reception quality information, where the communication control apparatus transmits the data of which transmission destination is each communication terminal apparatus assigned to each slot using the selected transmission form, and the communication terminal apparatus receives the data of the transmission form designated in the transmission form information from the communication control apparatus.

Thus, according to one aspect of the communication method according to the invention, each communication terminal apparatus measures the reception quality, and is capable of notifying the transmission form information to designate a suitable transmission form in transmitting feedback on the measured reception quality to the communication control apparatus. Each communication control apparatus is thereby capable of selecting a suitable transmission form for the communication terminal apparatus. Further, each communication terminal apparatus determines a transmission form of data to be transmitted from the communication control apparatus, and is thereby capable of reducing the processing of the communication control apparatus. Furthermore, since the feedback information transmitted from each communication terminal apparatus does not need to always include all the propagation path conditions, it is also possible to reduce transmission power of the communication terminal apparatus. The information of the suitable transmission form is transmitted from each communication terminal apparatus as feedback, and the communication control apparatus is thereby capable of performing more efficient data assignments.

(26) In one aspect of the wireless communication system according to the invention, it is a feature that the feedback information generating section generates the feedback information using, as the reception quality information, either an average measurement result calculated from the average measurement result obtained by averaging measurement results of reception quality of a plurality of slots or the measurement results respectively of reception quality of the plurality of slots, and that the transmission form determining section selects a frequency diversity scheme as a transmission form when the feedback information is the average measurement result, while selecting a multi-user diversity scheme as a transmission form when the feedback information is the measurement value results.

Thus, the communication terminal apparatus edits the measurement result of reception quality with a data form of the average measurement result or the measurement result of reception quality of each slot, and is thereby capable of notifying the communication control apparatus of the reception quality and transmission form. Further, the communication control apparatus is capable of determining the transmission form by the data form of the reception quality information, while acquiring the reception quality information required for generation of the transmission data. It is thereby possible to reduce the information amount of the feedback information.

ADVANTAGEOUS EFFECT OF THE INVENTION

According to the invention, the communication terminal apparatus transmits feedback on the information regarding the reception quality and transmission form to the communication control apparatus in a predetermined form, and the communication control apparatus is thereby capable of efficiently switching among a plurality of transmission forms based on the feedback information to transmit data to the communication terminal apparatus.

DESCRIPTION OF SYMBOLS

Figure 1:
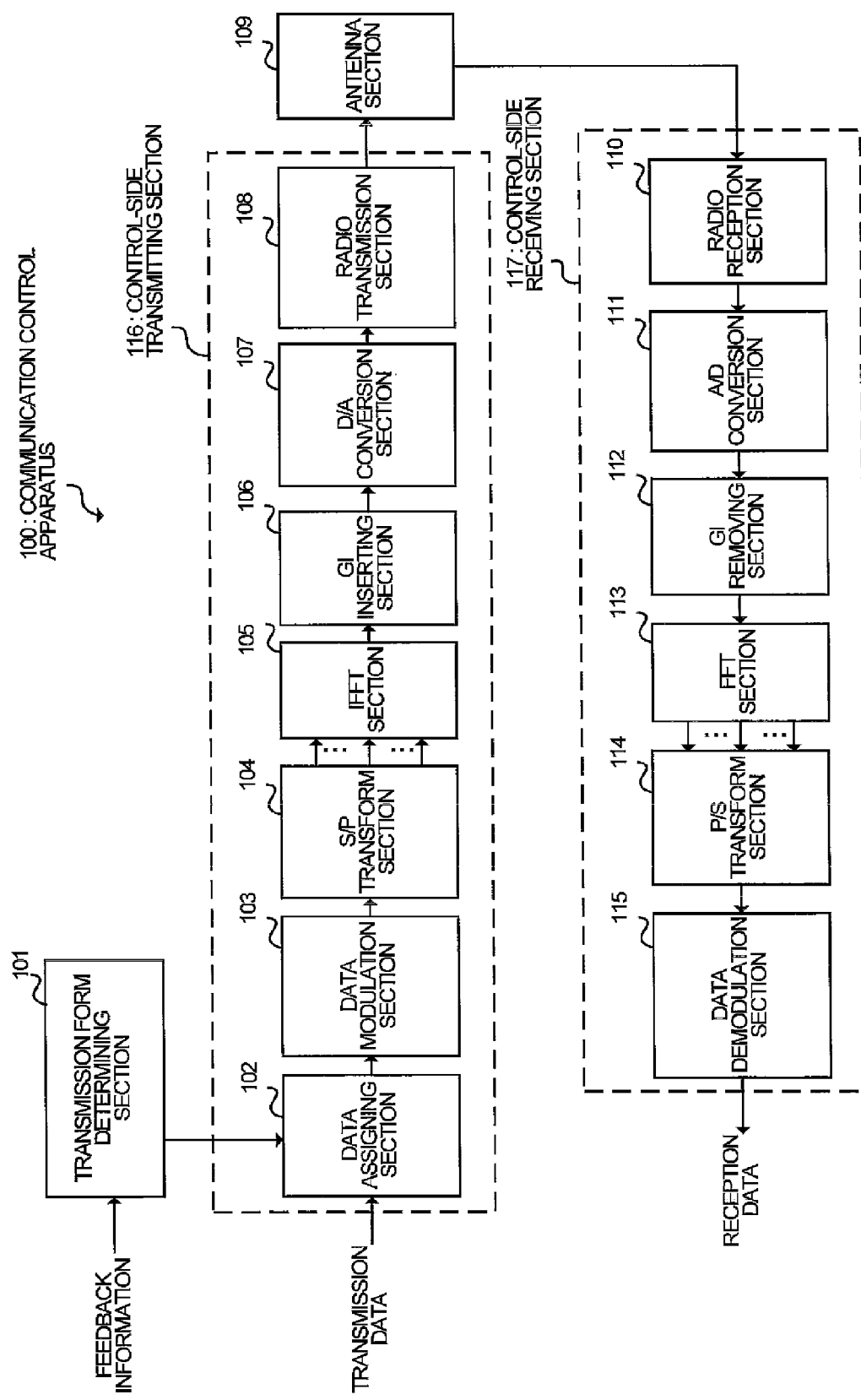
FIG. 1 is a block diagram showing a schematic configuration of a communication control apparatus according to the first embodiment.

100 Communication control apparatus
101 Transmission form determining section
102 Data assigning section
103 Data modulation section
104 S/P transform section
105 IFFT section
106 GI inserting section
107 D/A conversion section
108 Radio transmission section
109 Antenna section
110 Radio reception section
111 A/D conversion section
112 GI removing section
113 FFT section
114 P/S transform section
115 Data demodulation section
116 Control-side transmitting section
117 Control-side receiving section
200 Communication terminal apparatus
201 Data modulation section
202 S/P transform section
203 IFFT section
204 GI inserting section
205 D/A conversion section
206 Radio transmission section
207 Antenna section
208 Radio reception section
209 A/D conversion section
210 GI removing section 211 FFT section
212 P/S transform section
213 Data demodulation section
214 Reception quality measuring section
215 Transmission form selecting section
216 Feedback information generating section
217 Terminal-side transmitting section
218 Terminal-side receiving section

BEST MODE FOR CARRYING OUT THE INVENTION

Embodiments of the invention will be described below with reference to accompanying drawings.

This description describes as an example a wireless communication system in which a communication control apparatus controls communications of a plurality of communication terminal apparatus, while communications are performed among communication terminal apparatuses under control of the communication control apparatus. The wireless communication system uses a multicarrier communication scheme.

In each embodiment described below, the wireless communication system is explained using a communication scheme of one-cell reuse OFDM/(TDMA,FDMA). In the wireless communication system, the communication control apparatus performs radio communication with a plurality of communication terminal apparatuses, and allocates resources in a frame adaptively to each communication terminal apparatus to transmit data packets to each communication terminal apparatus. More specifically, the communication control apparatus assigns data to transmit to a plurality of slots constituting a frame. In this description, the frame is comprised of a plurality of slots as an example shown in FIG. 10. The slot is specified by one or more time channels each defined by a predetermined time length, and one or more frequency channels each defined by a predetermined frequency band.

Each communication terminal apparatus in the wireless communication system receives known information included in control information transmitted from the communication control apparatus, and measures reception quality. Each communication terminal apparatus generates the feedback information based on the measured reception quality. At this point, each communication terminal apparatus notifies a form (transmission form) of transmission data to be transmitted from the communication control apparatus to the communication terminal apparatus together with the reception quality as the feedback information, and is thereby capable of requesting the form of the transmission data. The communication control apparatus allocates resources (slots) to each communication terminal apparatus, based on the feedback information from each communication terminal apparatus and a state of a transmission data buffer for each communication terminal apparatus present in the communication control apparatus. At this point, the communication control apparatus selects a transmission form suitable for each communication terminal apparatus by the transmission form notified from each communication terminal apparatus, and allocates resources for the transmission data.

Further, each embodiment makes an explanation using the wireless communication system comprised of the communication control apparatus and communication terminal apparatuses. In addition, the drawings show a single communication terminal, but a plurality of communication terminal apparatuses exists and the communication control apparatus is capable of transmitting and receiving signals to/from a plurality of communication terminal apparatuses.

(First Embodiment)

Figure 2:
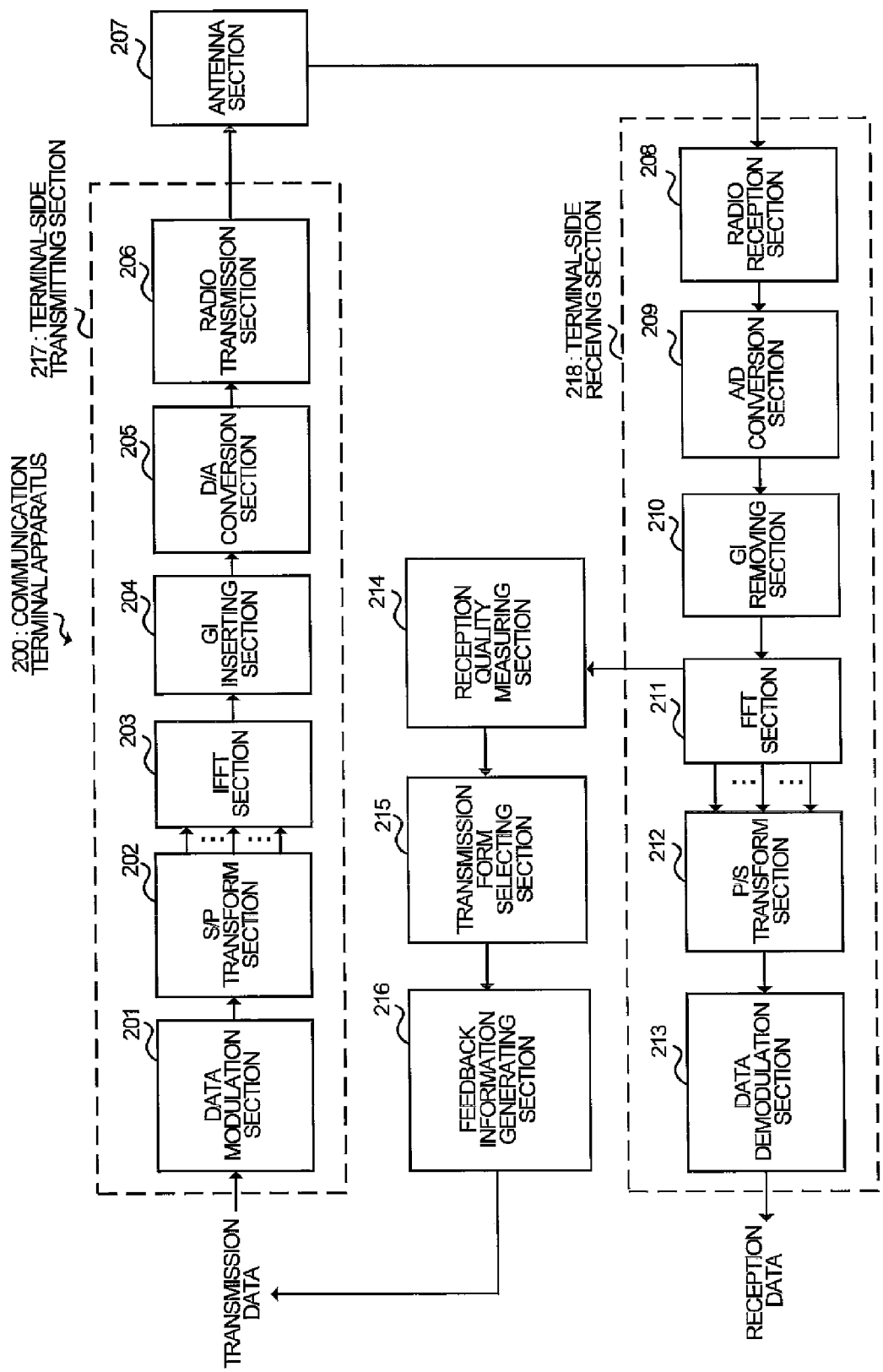
FIG. 2 is a block diagram showing a schematic configuration of a communication terminal apparatus according to the first embodiment.

An embodiment according to the first embodiment will be described below with reference to accompanying drawings. FIG. 1 is a block diagram showing a schematic configuration of a communication control apparatus according to the first embodiment. FIG. 2 is a block diagram showing a schematic configuration of a communication terminal apparatus according to the first embodiment. This embodiment makes an explanation using a wireless communication system comprised of the communication control apparatus 100 and communication terminal apparatus 200. The communication control apparatus 100 has a transmission form determining section 101, data assigning section 102, data modulation section 103, S/P (Serial/Parallel) transform section 104, IFT (Inverse Fast Fourier Transform) section 105, GI (Guard Interval) inserting section 106, D/A (Digital/Analog) conversion section 107, radio transmission section 108, antenna section 109, radio reception section 110, A/D (Analog/Digital) conversion section 111, GI removing section 112, FFT (Fast Fourier Transform) section 113, P/S (Parallel/Serial) transform section 114 and data demodulation section 115.

The transmission form determining section 101 determines a transmission form based on feedback information transmitted from each communication terminal apparatus 200.

The data assigning section 102 allocates resources (slots) in a communication frame to packet data to transmit to each communication terminal apparatus 200. The data modulation section 103 modulates a transmission signal. The S/P transform section 104 transforms serial signals of the transmission signal into parallel signals. The IFFT section 105 performs IFFT processing on the transmission signal. The GI inserting section 106 inserts a guard interval into the transmission signal. The D/A conversion section 107 converts the digital transmission signal into an analog transmission signal. The radio transmission section 108 transmits the analog transmission signal. The antenna section 109 transfers a radio transmission signal and a radio reception signal. The radio reception section 110 receives an analog reception signal. The A/D conversion section 111 converts the analog reception signal into a digital reception signal. The GI removing section 112 removes a GI of the reception signal. The FFT section 113 performs FFT processing on the reception signal. The P/S transform section 114 transforms reception parallel signals into serial signals. The data demodulation section 115 demodulates the reception signal.

The communication terminal apparatus 200 has a data modulation section 201, S/P transform section 202, IFFT section 203, GI inserting section 204, D/A conversion section 205, radio transmission section 206, antenna section 207, radio reception section 208, A/D conversion section 209, GI removing section 210, FFT section 211, P/S transform section 212, data demodulation section 213, reception quality measuring section 214, transmission form selecting section 215, and feedback information generating section 216.

The data modulation section 201 modulates a transmission signal. The S/P transform section 202 transforms serial signals of the transmission signal into parallel signals. The IFFT section 203 performs IFFT processing on the transmission signal. The GI inserting section 204 inserts a GI into the transmission signal. The D/A conversion section 205 converts the digital transmission signal into an analog transmission signal. The radio transmission section 206 transmits the analog transmission signal. The antenna section 207 transfers a radio transmission signal and a radio reception signal. The radio reception section 209 receives an analog reception signal. A/D conversion section 209 converts the analog reception signal into a digital reception signal. The GI removing section 210 removes a GI of the reception signal. The FFT section 211 performs FFT processing on the reception signal. The P/S transform section 212 transforms reception parallel signals into serial signals. The data demodulation section 213 demodulates the reception signal.

The reception quality measuring section 214 measures the propagation path conditions and reception quality of the reception signal. In this embodiment, the section 214 measures the reception quality of each slot using a control signal received from the communication control apparatus 100.

Based on a measurement result of the reception quality measured in the reception quality measuring section 214, the transmission form selecting section 215 selects a transmission form from among a plurality of transmission forms to assign data to a plurality of slots constituting a frame.

The feedback information generating section 216 generates feedback information based on the measurement result (reception quality measurement result) measured in the reception quality measuring section 214 and the transmission form selected in the transmission form selecting section 215. The feedback information is information to notify reception quality information indicating the reception quality in a plurality of slots and transmission form information for designating the selected transmission form. In this embodiment, the feedback information generating section 216 sets a plurality of different data forms corresponding to a plurality of transmission forms, selects a data form corresponding to the transmission form selected in the transmission form selecting section 215, edits the reception quality measurement result measured in the reception quality measuring section 214 into the selected data form to generate the reception quality information, and uses the generated reception quality information as the feedback information. The information will be described later with reference to FIG. 4.

In the following explanation, in the communication control apparatus 100, the data modulation section 103, S/P transform section 104, IFFT section 105, GI inserting section 106, D/A conversion section 107, and radio transmission section 108 are assumed to be a control-side transmitting section 116, while the radio reception section 110, A/D conversion section 111, GI removing section 112, FFT section 113, P/S transform section 114 and data demodulation section 115 are assumed to be a control-side receiving section 117. Further, in the communication terminal apparatus 200, explanations are made assuming that the data modulation section 201, S/P transform section 202, IFFT section 203, GI inserting section 204, D/A conversion section 205, and radio transmission section 206 are a terminal-side transmitting section 217, and that the radio reception section 208, A/D conversion section 209, GI removing section 210, FFT section 211, P/S transform section 212, and data demodulation section 213 are a terminal-side receiving section 218. The control-side transmitting section 116 and terminal-side transmitting section 217 have functions of modulating, converting and transforming the transmission data corresponding to the transmission form to transmit to a communicating apparatus via the antenna section 109, and the control-side receiving section 107 and terminal-side receiving section 208 have functions of receiving reception data from the communicating apparatus via the antenna section 109 and converting, transforming and demodulating the data corresponding to the transmission form. Further, the terminal-side receiving section 218 outputs the reception data processed in the FTT section 211 to the reception quality measuring section 214.

Figure 3:
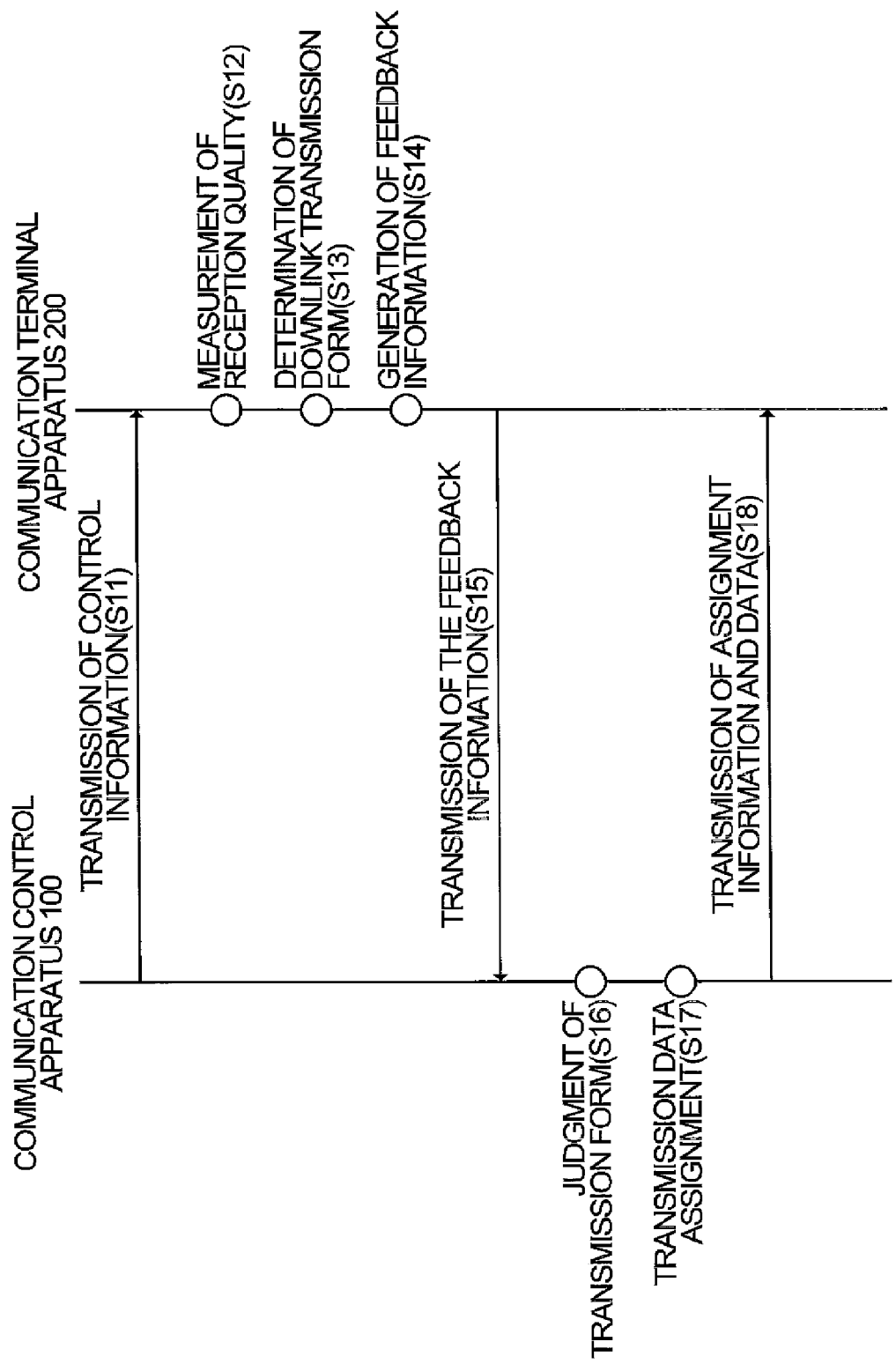
FIG. 3 is a diagram showing in time sequence an example of exchange of radio data between the communication control apparatus and communication terminal apparatus and the operation of each apparatus of the first embodiment.

The operation of the wireless communication system of this embodiment will be described next with reference to a sequence diagram according to this embodiment as shown in FIG. 3. FIG. 3 is a diagram showing in time sequence an example of exchange of radio data between the communication control apparatus and communication terminal apparatus and the operation of each apparatus of the first embodiment. The wireless communication system is a system provided with a single communication control apparatus 100 and a plurality of communication terminal apparatuses 200, the diagram as shown in FIG. 3 shows a state between one of a plurality of communication terminal apparatuses 200 and the communication control apparatus 100, and the other communication terminal apparatuses 200 are assumed to perform the same operation and perform radio communication with the communication control apparatus 100.

Figure 10:
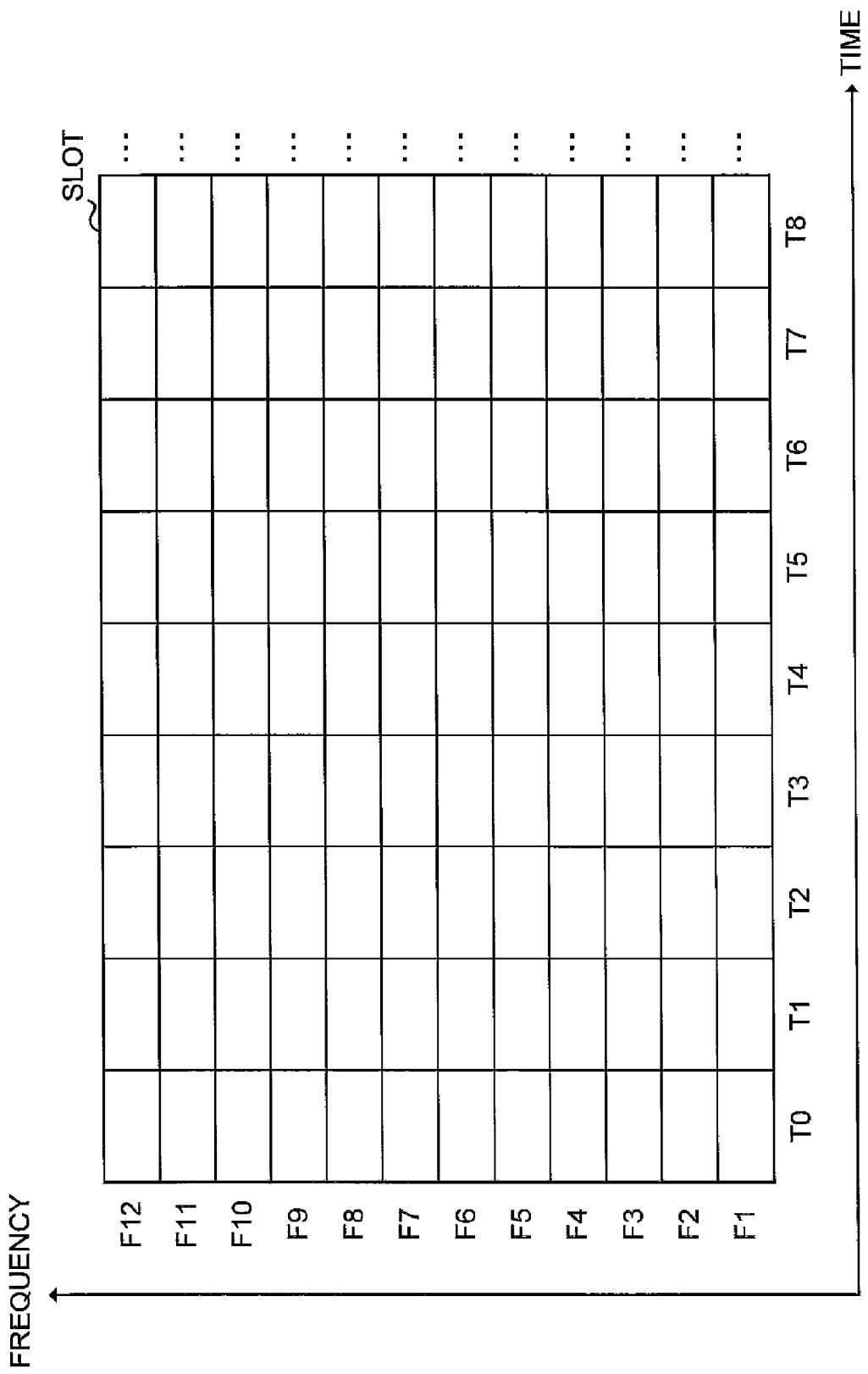
FIG. 10 is a diagram showing an example of a two-dimensional frame structure of OFDM/(TDMA,FDMA).

First, the communication control apparatus 100 transmits transmission data including the control information to the communication terminal apparatus 200 (step S11). The control information includes known information that the communication terminal apparatus 200 already knows. The transmission data is transmitted to each communication terminal apparatus 200 in a frame structure as shown in FIG. 10, and it is assumed that each slot includes a pilot symbol that is the known information, transmission power information and modulation scheme information. In addition, when power control is not performed on downlink communication frames and each slot is always transmitted with certain power, each slot does not need to always include the transmission power information. This embodiment describes about the case of not performing power control in downlink radio communication.

The communication terminal apparatus 200 receives transmission data including the control information from the communication control apparatus 100. The terminal-side receiving section 218 performs the FFT processing on the transmission data to output to the reception quality measuring section 214, and the reception quality measuring section 214 measures the reception quality of each slot (step S 12). The reception quality measuring section 214 measures the reception quality (propagation path conditions) using the known control information included in the slot. This embodiment describes the case where the reception quality measuring section 214 measures propagation path conditions (propagation path quality) indicating the quality (environment) of the propagation path as the reception quality, but other reception quality may be used.

More specifically, it is possible to use an index or the like indicating propagation path quality such as SINR (Signal to Interference and Noise Ratio), SNR (Signal to Noise Ratio), SIR (Signal to Interference Ratio), CINR (Carrier to Interference and Noise Ratio), CNR (Carrier to Noise Ratio), CIR (Carrier to Interference Ratio), RSSI (Received Signal Strength Indicator) and the like calculated from the reception signal power and carrier signal power, or reception data quality such as BER (Bit Error Rate), PER (Packet Error Rate), BLER (Block Error Rate) and the like calculated from error amounts of reception data. Further, the reception quality measuring section 214 measures slots with the same frequency consecutively in the time-axis direction. By this means, the reception quality measuring section 214 is capable of measuring a temporal change in propagation path conditions, and the change can also be used for an index of moving speed of the communication terminal apparatus 200.

Figure 4:
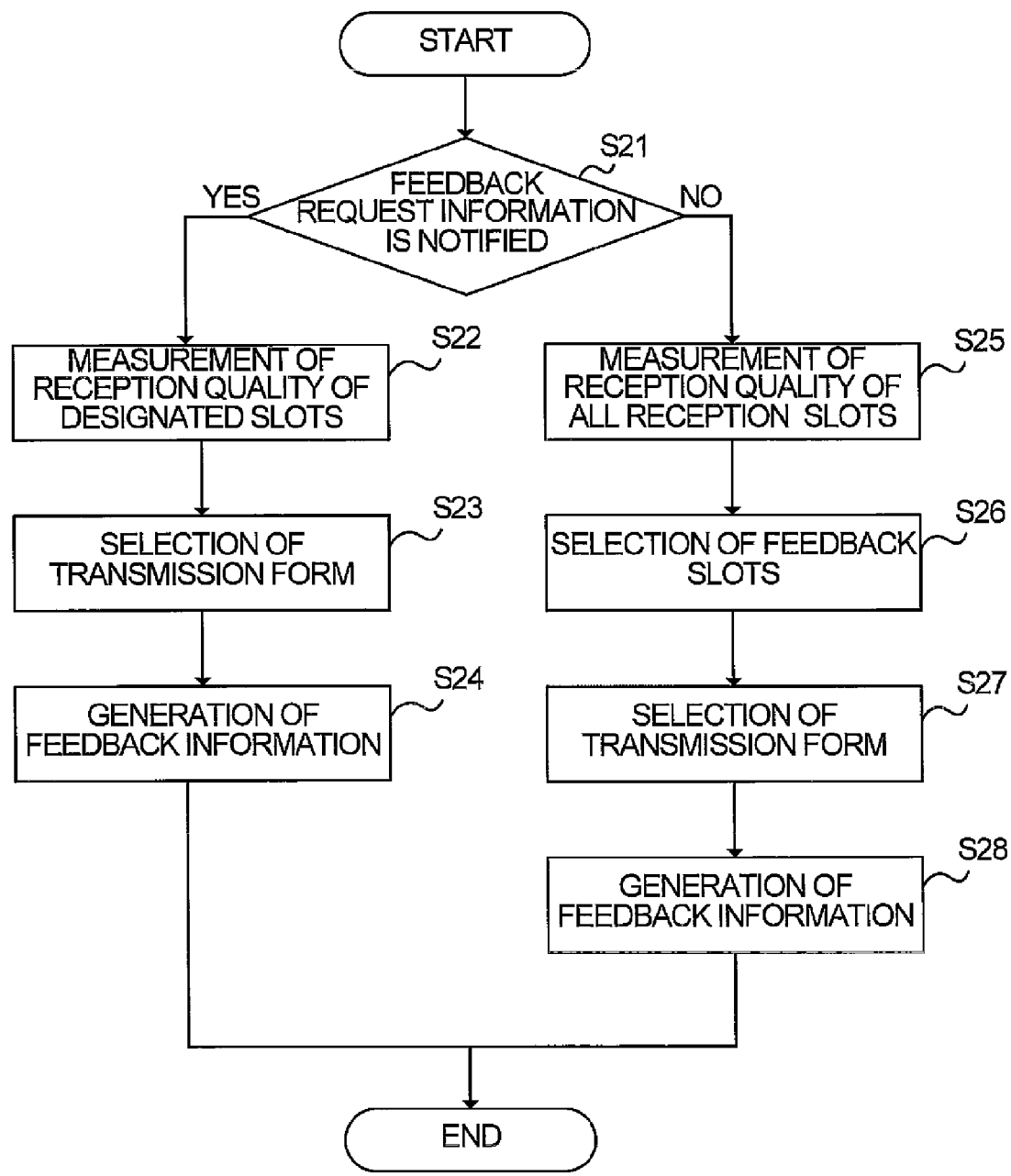
FIG. 4 is a diagram showing an example of the operation of generating feedback information in the communication terminal apparatus of this embodiment.

Next, the transmission form selecting section 215 of the communication terminal apparatus 200 selects one transmission form from a plurality of transmission forms based on the reception quality measurement result measured in the reception quality measuring section 214 (step S13). The feedback information generating section 216 generates the feedback information based on the transmission form selected in the transmission form selecting section 215 and the reception quality measurement result measured in the reception quality measuring section 214 (step S14). The feedback information is notified to the communication control apparatus 100 by uplink radio communication (step S15). More specific operation for the communication terminal apparatus 200 to generate the feedback information will be described with reference to FIG. 4. FIG. 4 is a diagram showing an example of the operation of generating the feedback information in the communication terminal apparatus 200 of this embodiment.

First, the reception quality measuring section 214 of the communication terminal apparatus 200 determines whether feedback request information is notified from the communication control apparatus 100 (step S21). The feedback request information is included in the control information received in the terminal-side receiving section 217, but a method may be used for notifying the information by the control information received this time or for using the feedback request information notified by the control information received previously.

The feedback request information is information for designating slots to measure the reception quality (propagation path quality, reception data quality, moving speed and the like) and requesting for feedback on reception quality information based on reception quality measurement results of measured reception quality of the designated slots. In other words, the feedback request information is information for designating slots among a plurality of slots to notify measurement results of the reception quality of the slots as feedback information. The slots requested (designated) in the feedback request information are referred to as designated slots. The feedback request information is to designate some slots among F1 to F12 in the frame structure as shown in FIG. 10. More specifically, a method is considered for designating four consecutive slots, F1 to F4, three non-consecutive slots, F1, F5 and F9, or the like. By this means, the communication control apparatus 100 is capable of acquiring the reception quality information of slots (slots that are candidates for allocation) desired to assign the communication terminal apparatus 200. Further, it is possible to suppress reception quality information amounts.

When the feedback request information is notified from the communication control apparatus 100 (YES in step 21), the communication terminal apparatus 200 measures the reception quality on slots (designated slots) in designated positions (step S22).

Next, in the communication terminal apparatus 200, the transmission form selecting section 215 selects one transmission form from a plurality of transmission forms based on the reception quality measurement results of the designated slots measured in the reception quality measuring section 214 (step S23). The transmission form selecting section 215 compares the reception quality measurement result with a predetermined threshold, and determines whether the reception quality is good. When there are two or more transmission forms, the section 215 compares the reception quality using multistage thresholds to select a transmission form.

In this embodiment, a multi-user diversity form and frequency diversity form are used as the transmission form. The multi-user diversity form is a scheme for applying a modulation parameter corresponding to propagation path conditions of each communication terminal apparatus 200, allocating each slot to the communication terminal apparatus 200 with good propagation path conditions to perform packet transmission, and thereby obtaining the multi-user diversity effect for enhancing throughput in the entire cell. The modulation parameter is a parameter to specify at least one of a modulation scheme, coding rate and spreading ratio, and includes the case of specifying a combination of two or more of a modulation scheme, coding rate and spreading ratio. The frequency diversity form is a scheme for using a plurality of slots in the frequency-axis direction in scheduling, and obtaining the frequency diversity effect in downlink radio communication. In addition, the transmission form is not limited to above-mentioned two forms, and the present invention is applicable to a plurality of transmission forms, for example, a plurality of different transmission forms such as a first transmission form, second transmission form and the like. Specific examples of the transmission scheme will be described later with reference to FIGS. 5 to 7.

The transmission form selecting section 215 selects the multi-user diversity form when the propagation path conditions are good, while selecting the frequency diversity form when the propagation path conditions are poor, or when the moving speed of the communication terminal apparatus 200 is fast and variations in propagation path conditions are intense. The transmission form selecting section 215 selects a transmission form by whether the predetermined reception quality is met or not. The transmission form selecting section 215 may select the multi-user diversity form usually, and when the propagation path conditions are poor, or when the moving speed of the communication terminal apparatus 200 is fast and variations in propagation path conditions are intense, vary the transmission form. By varying the transmission form, radio transmission and reception is performed while using a plurality of slots in the frequency-axis direction in scheduling in the communication control apparatus 100 corresponding to the propagation path conditions, and thereby producing the frequency diversity effect in downlink radio communication.

The feedback information generating section 216 generates the feedback information based on the reception quality measurement result measured in the reception quality measuring section 214 and the transmission form selected in the transmission form selecting section 215 (step S24). The feedback information generating section 216 selects a data form corresponding to the transmission form selected in the transmission form selecting section 215 from among a plurality of data forms, and edits the reception quality measurement result of the selected data form to generate the feedback information. In this embodiment, as the data form of the reception quality information included in the feedback information, two different data forms are used. One is a measurement value form for associating the reception quality measurement result with the position (slot number) of the designated slot to generate the feedback information, and the other one is an average value form for averaging reception quality measurement results of designated slots to calculate an average measurement result, and generating the calculated average measurement result as the feedback information. In addition, it is possible to arrange the reception quality information of designated slots on a certain condition, for example, arrange slots in ascending order of the frequency in the frequency-axis direction (starting with F1 side of the frequency slots as shown in FIG. 10) or the like to substitute for association with the slot number, and it is thereby possible to reduce the information amount indicating the slot number.

Accordingly, the feedback information generating section 216 associates the measurement result of the measured reception quality with the slot number of the designated slot, and generates the feedback information in the measurement value form when the transmission form selecting section 215 selects the multi-user diversity form. Meanwhile, when the transmission form selecting section 215 selects the frequency diversity form, the section 216 calculates an average measurement result using the measurement results of the reception quality and the number of designated slots, combines the average measurement result and positions (slot numbers) of the designated slots used by calculating the average value, and generates the feedback information in the average value form.

Further, as the feedback information, it is not necessary to always send back the reception quality measurement result described previously. The feedback information can be notified using data obtained by quantizing the reception quality measurement result, modulation scheme enabling transmission and reception in the measured reception quality or information bit representing such a modulation scheme, or a variation value from a reception quality measurement value that was measured on the previous measurement occasion and notified to the communication control apparatus 100 or information bit obtained by quantizing the variation value. By this means, it is possible to contribute to reductions in data amount in uplink radio communication, and further, reduce power consumption of the communication terminal apparatus 200.

When the feedback request information is not notified from the communication control apparatus 100 (NO in step S21), the reception quality of all the slots is measured (step S25). When the feedback request information is not notified, to reduce measurement amounts and data processing amounts, the communication terminal apparatus 200 is capable of beforehand setting slots to measure propagation path conditions. Based on the reception quality measurement results of all the measured slots, the reception quality measuring section 214 selects slots to notify the communication control apparatus 100 of the reception quality information i.e. slots (feedback slots, selected slots) to include the reception quality information regarding the reception quality measurement results in the feedback information (step S26). For example, the section 214 is capable of selecting feedback slots on conditions of higher five slots in descending order of excellence of propagation path conditions, higher four slots in descending order of excellence of propagation path conditions and one lower slot, one or more slot groups enabling a transmittable modulation scheme with highest efficiency to be selected, or the like. Further, when the number of slots for feedback among all of measured slots is designated from the communication control apparatus 100, slots corresponding to the number designated according to the predetermined condition are selected to be feedback slots. By limiting to slots with good reception quality to notify, the communication control apparatus is capable of performing scheduling with efficiency. Further, by also notifying slots with poor reception quality, the communication control apparatus is capable of grasping fluctuations in reception quality.

The feedback slots can be selected prior to measurement of the reception quality, subsequent to measurement of the reception quality, or both prior to and subsequent to measurement of the reception quality. After measuring the reception quality of all the slots, the apparatus 200 is capable of selecting slots with good reception quality as feedback slots. It is thus possible to select feedback slots in which the reception quality is reflected. Meanwhile, after selecting feedback slots in advance, the reception quality is measured. For example, this method is effective in the case where the reception quality can be predicted from the last measurement result. Further, it is possible to set a range to measure the reception quality among a plurality of slots, measure the reception quality, and then, select feedback slots based on the reception quality. By first selecting a predetermined range among a plurality of slots, it is possible to reduce the load of measuring the reception quality.

The reception quality measuring section 214 notifies the transmission form selecting section 215 of slot numbers of selected feedback slots, and the reception quality measurement results. Further, when slots to measure propagation path conditions are beforehand set, the reception quality measuring section 214 may select feedback slots from among the slots of which reception quality is measured, or may notify about all the set slots to the transmission form selecting section 215. Alternately, feedback slots may be all the measured slots.

The transmission form selecting section 215 selects one transmission form from a plurality of transmission forms based on the reception quality measurement results of the feedback slots selected in the reception quality measuring section 214 (step S27). The transmission form is the same as described previously.

The feedback information generating section 216 generates the feedback information based on the reception quality measurement results measured by the reception quality measuring section 214 and the transmission form selected by the transmission form selecting section 215 (step S28). When the data form is the multi-user diversity form, the feedback information has the measurement value form to notify reception quality measurement results of all the measured slots or reception quality measurement results of selected feedback slots, and is generated by associating the reception quality measurement result of each measured slot with information (slot number) indicating the position of the slot. When the data form is the frequency diversity form, the feedback information has the average value form to notify the average measurement result of feedback slots, the reception quality measurement results of all of measured slots or all of measured feedback slots is averaged, and the averaged average measurement result and slot numbers of the feedback slots are generated as the feedback information. Thus, the feedback information generating section 216 generates the reception quality measurement results of all the slots (or feedback slots) and slot numbers indicating all the slots (or feedback slots) as the feedback information in the measurement value form, while in the average value form, generating the feedback information by combining the average measurement result and at least one of information indicating an average of reception quality measurement results of a plurality of slots, the number of slots used in calculating the average value, and slot numbers indicating slot positions used in calculating the average value.

Described next is the operation of the communication control apparatus 100 receiving the feedback information, with reference to FIG. 3. The communication control apparatus 100 receives the feedback information transmitted from each communication terminal apparatus 200 (step S15), and the transmission form determining section 101 determines the transmission form to each communication terminal apparatus and a modulation scheme of transmission data for each communication terminal apparatus 200 by the data form of the feedback information (step S16). More specifically, the section 101 determines the data form of the feedback information transmitted from the communication terminal apparatus 200, and based on the determined data form, selects a transmission form. In this embodiment, the section 101 selects the multi-user diversity form when the feedback information has the measurement value form as the data form of the reception quality information, while selecting the frequency diversity form when the feedback information has the average value form as the data form of the reception quality information.

Figure 5:
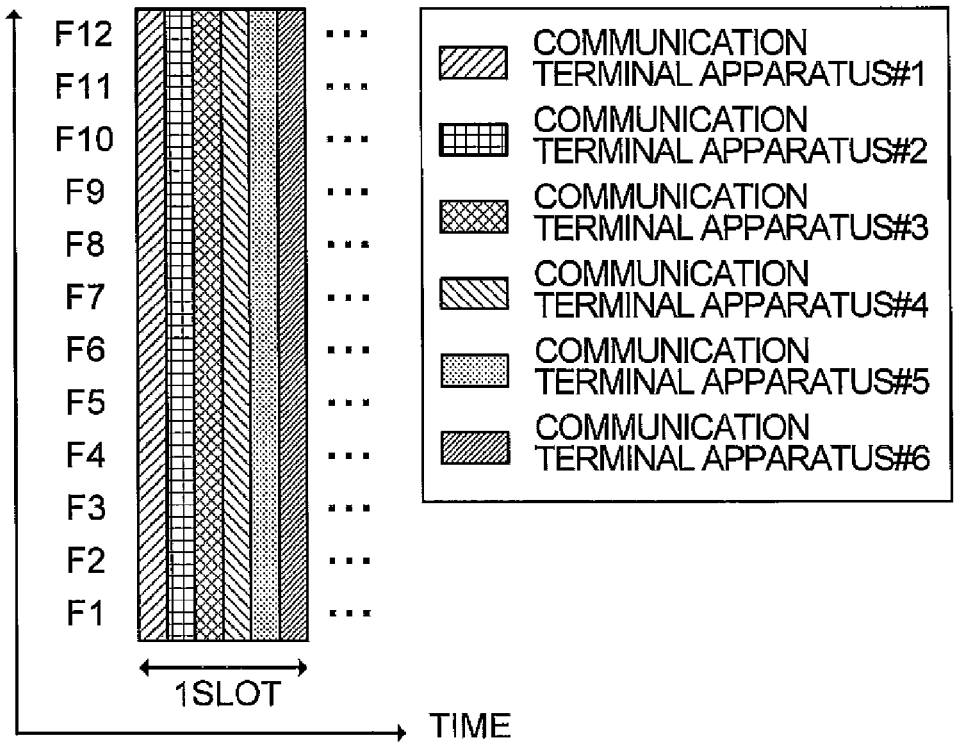
FIG. 5 is a diagram showing an example of a slot structure (in the case of using all the frequency bands) of a frequency diversity form.
Figure 6:
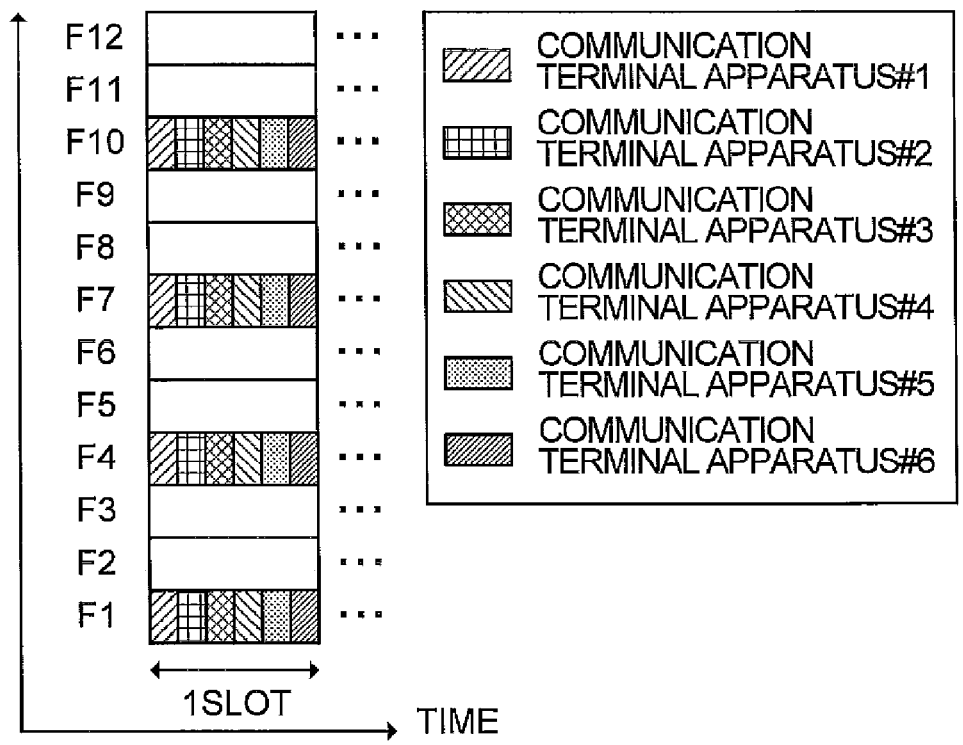
FIG. 6 is a diagram showing an example of another slot structure (in the case of using part of the frequency bands) of the frequency diversity form.
Figure 7:
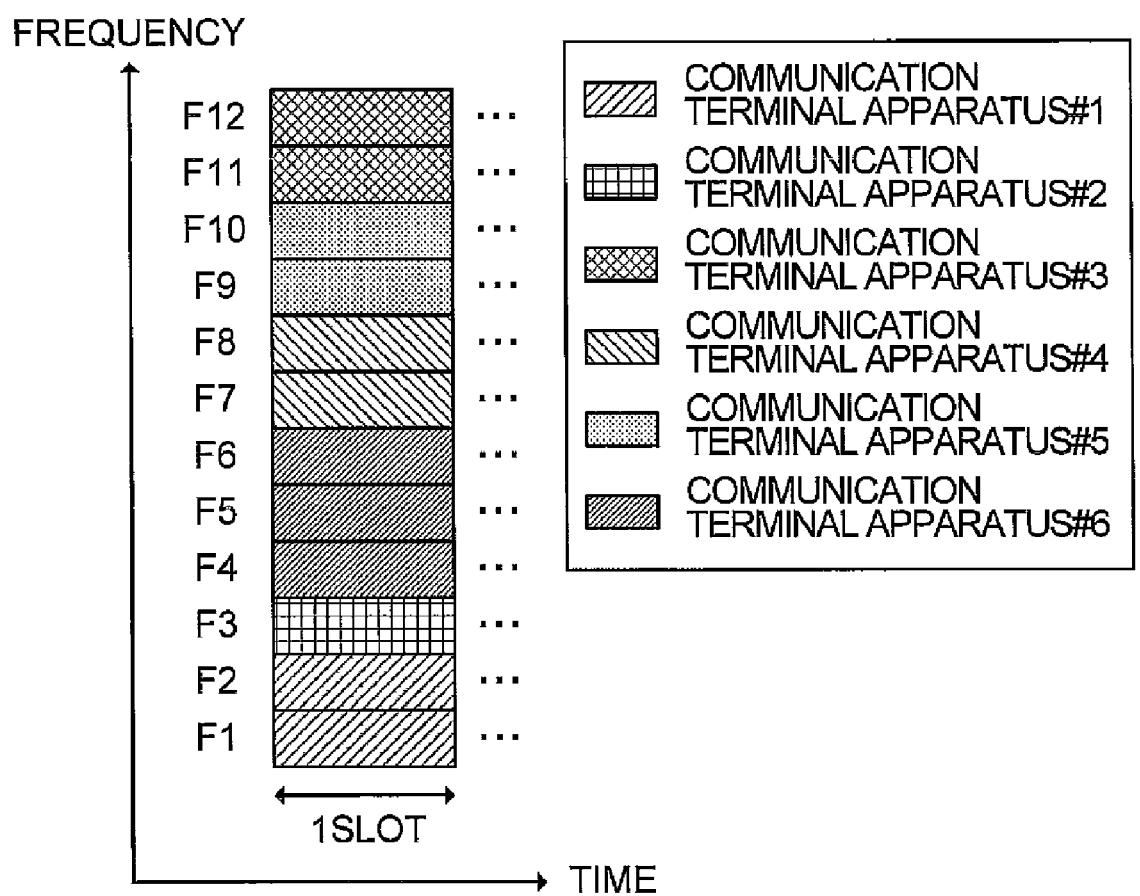
FIG. 7 is a diagram showing an example of a slot structure of a multi-user diversity form.

Next, the data assigning section 102 assigns the transmission data to each slot based on the reception quality measurement result included in the feedback information and the transmission form determined by the transmission form determining section 101 (step S17). FIGS. 5 and 6 are diagrams showing an example of a slot structure of the frequency diversity form. In the frequency diversity form, a plurality of slots in the frequency direction is assigned to same-time slots to obtain the frequency diversity effect. FIG. 7 is a diagram showing an example of slot allocation of the multi-user diversity form. The multi-user diversity form is to determine a communication terminal apparatus 200 to assign for each slot, and allocate slots to perform downlink radio communication.

When the transmission form is the frequency diversity form, as an example shown in FIGS. 5 and 6, based on the average measurement value, the data assigning section 102 divides one slot in the time-axis direction, and assigns the transmission data of which transmission destinations are a plurality of communication terminal apparatuses. In the transmission form to allocate slots in the frequency diversity form, FIG. 5 shows an example of using all the bands, and the form is to enhance tolerance to variations in frequency selective propagation path conditions in the frequency-axis direction by allocating data packets with low coding rates repeatedly as transmission symbols in the frequency direction over all the frequency bands. FIG. 6 shows an example of using part of frequency bands to assign discontinuously, and the form is to enhance tolerance to variations in frequency selective propagation path conditions in the frequency-axis direction by allocating in the frequency direction a plurality of slots each with transmission symbols arranged in the frequency direction data. Meanwhile, when the transmission form is the multi-user diversity form, the data assigning section 102 assigns the transmission data for each slot as an example shown in FIG. 7. FIG. 7 shows the form to determine a communication terminal apparatus 200 to assign by considering propagation path conditions, state of the transmission buffer, data transmission priority, quality assurance and the like for each slot. Further, the data assigning section 102 determines a modulation parameter based on the information of the feedback from each communication terminal apparatus 200.

The control-side transmitting section 116 transmits the assignment information that the communication terminal apparatus is assigned to each slot and the transmission data (step S18).

In the aforementioned descriptions, such an aspect is explained that the communication control apparatus 100 selects a transmission form corresponding to the data form of the feedback information transmitted from each communication terminal apparatus 200, assigns transmission data to transmit to each communication terminal apparatus 200 to each slot, and performs downlink radio transmission. Feedback intervals at which the communication control apparatus acquires the feedback information from the communication terminal apparatus 200 are the same as the duration of a slot length in the shortest interval. The communication control apparatus 100 is capable of performing slot allocation at the same intervals as the feedback intervals. On the other hand, to simplify and reduce operating power, the communication control apparatus 100 does not need to always perform slot allocation at the same intervals as the feedback intervals.

Thus, in this embodiment, each communication terminal apparatus measures the reception quality (propagation path conditions), notifies the feedback information in a predetermined data form in transmitting the feedback to the communication control apparatus, and is thereby capable of notifying the transmission form information for designating a transmission form. Each communication control apparatus is thereby capable of selecting a suitable transmission form for the communication terminal apparatus, and it is possible to notify the reception quality using the data form of the reception quality measurement result required for the communication control apparatus to transmit data. Further, each communication terminal apparatus determines a transmission form of data to be transmitted from the communication control apparatus, and is thereby capable of reducing the processing of the communication control apparatus. Furthermore, since the feedback information transmitted from each communication terminal apparatus does not need to always include all the propagation path conditions, it is also possible to reduce transmission power of the communication terminal apparatus by limiting slots as designated slots, feedback slots or the like. The information of the suitable transmission form is transmitted from each communication terminal apparatus as feedback, and the communication control apparatus is thereby capable of performing more efficient data assignments.

(Second Embodiment)

The second embodiment has the same basic system as that in the first embodiment, and describes an aspect where the method for each communication terminal apparatus to notify the transmission form information in transmitting feedback is different from that in the first embodiment.

The wireless communication system according to the second embodiment of the invention will be described below. Also in the second embodiment, as in the first embodiment, the wireless communication scheme is explained using one-cell reuse OFDM/(TDMA,FDMA) system.

Also in the second embodiment, the communication control apparatus 100 receives the feedback information generated based on the reception quality measurement result measured in each communication terminal apparatus 200, demodulates the information, and is thereby capable of determining a transmission form of transmission data transmitted from each communication terminal apparatus 200 based on the feedback information. In the aspect of the second embodiment, the communication terminal apparatus 200 adds the transmission form information for specifying the transmission form to the feedback information, and the communication control apparatus 100 determines the transmission form based on the transmission form information added to (included in) the feedback information.

The communication control apparatus 100 of this embodiment has the same configuration as in FIG. 1, and applies the same block structure as in the first embodiment. The difference from the first embodiment is a respect that the feedback information input to the transmission form determining section 101 includes the transmission form information for designating a transmission form as the additional information. The transmission form determining section 101 determines a transmission form of transmission data that the communication control apparatus 100 transmits to each communication terminal apparatus 200, using the transmission form information included in the feedback information notified from each communication terminal apparatus 200.

The communication terminal apparatus 200 of this embodiment has the same configuration as in FIG. 2, and applies the same block structure as in the first embodiment. In the communication terminal apparatus 200, the reception quality measuring section 214 measures the reception quality of slots, and the transmission form selecting section 215 selects a transmission form based on measurement results of measured reception quality. The feedback information generating section 216 generates the reception quality information based on the reception quality measurement results measured by the reception quality measuring section 214, further generates the transmission form information indicating the transmission form selected by the transmission form selecting section 215, and generates the feedback information including the generated reception quality information and generated transmission form information. The transmission form information is only required to be information for designating a transmission form, and specifies a transmission form by data of numeric value, character string or others determined between the communication control apparatus 100 and the apparatus 200.

Figure 8:
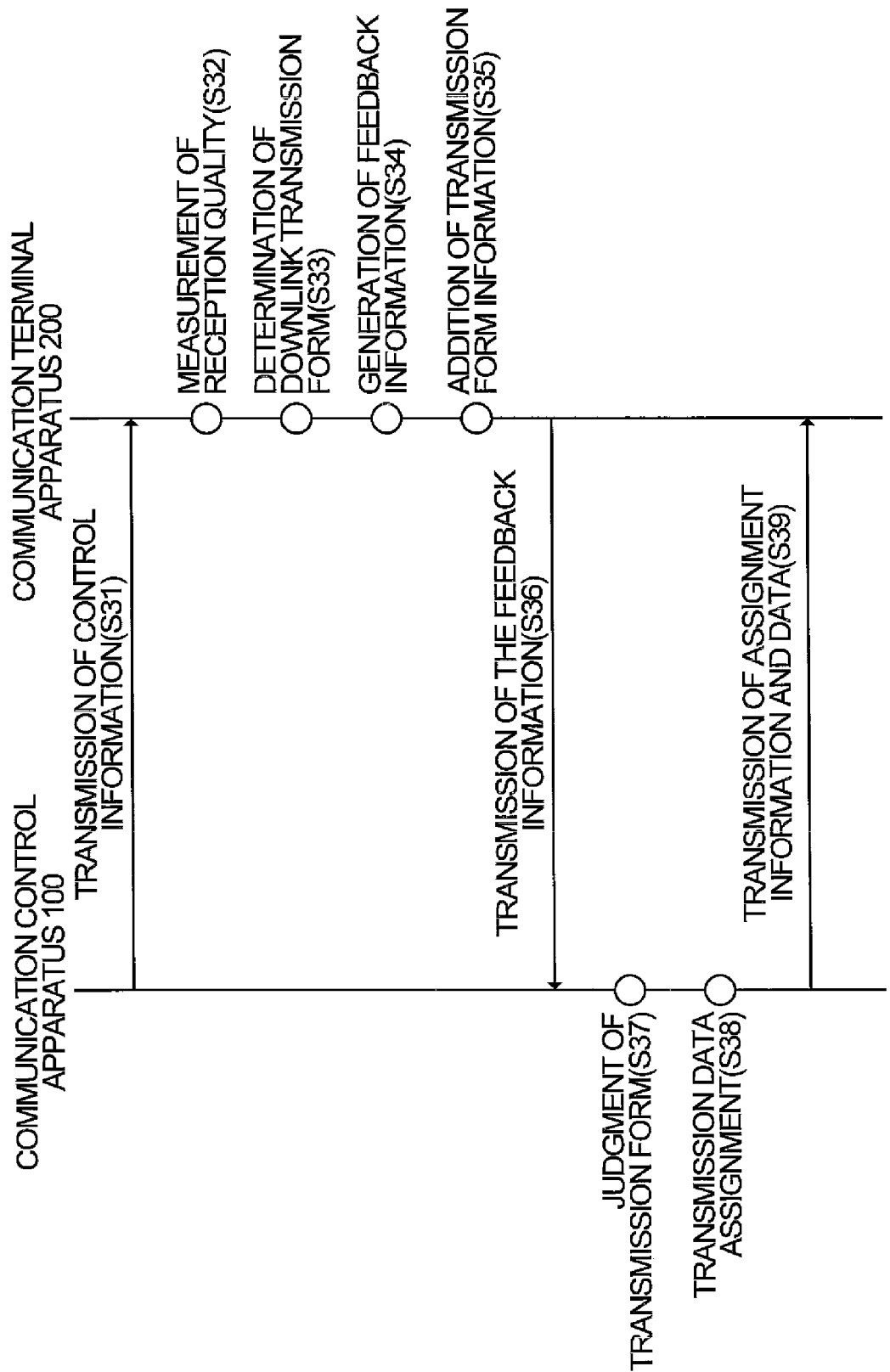
FIG. 8 is a diagram showing in time sequence an example of exchange of radio data between a communication control apparatus and communication terminal apparatus and the operation of each apparatus of the second embodiment.

The operation of the wireless communication system of this embodiment will be described below with reference to a sequence diagram according to this embodiment as shown in FIG. 8. FIG. 8 is a diagram showing in time sequence an example of exchange of radio data between the communication control apparatus and communication terminal apparatus and the operation of each apparatus of the second embodiment. The wireless communication system is a system provided with a single communication control apparatus 100 and a plurality of communication terminal apparatuses 200, FIG. 8 shows a state between one of a plurality of communication terminal apparatuses 200 and the communication control apparatus 100, and the other communication terminal apparatuses 200 are assumed to perform the same operation and perform radio communications with the communication control apparatus 100.

First, the communication control apparatus 100 transmits transmission data including the control information to the communication terminal apparatus 200 (step S31). The control information includes known information that the communication terminal apparatus 200 already knows. The transmission data is transmitted to each communication terminal apparatus 200 in a frame structure as shown in FIG. 10, and it is assumed that each slot includes a pilot symbol that is the known information, transmission power information and modulation scheme information. The second embodiment describes about the case of not performing power control in downlink radio communication.

The communication terminal apparatus 200 receives transmission data including the control information from the communication control apparatus 100. The terminal-side transmitting section 217 performs the FFT processing on the transmission data to output to the reception quality measuring section 214, and the reception quality measuring section 214 measures the reception quality of each slot (step S32). As the reception quality, the same indexes as shown in the first embodiment are applicable. This embodiment describes the case where the reception quality measuring section 214 measures propagation path conditions as the reception quality. The reception quality measuring section 214 measures propagation path conditions using the known information in a pilot symbol included in the slot.

Figure 9:
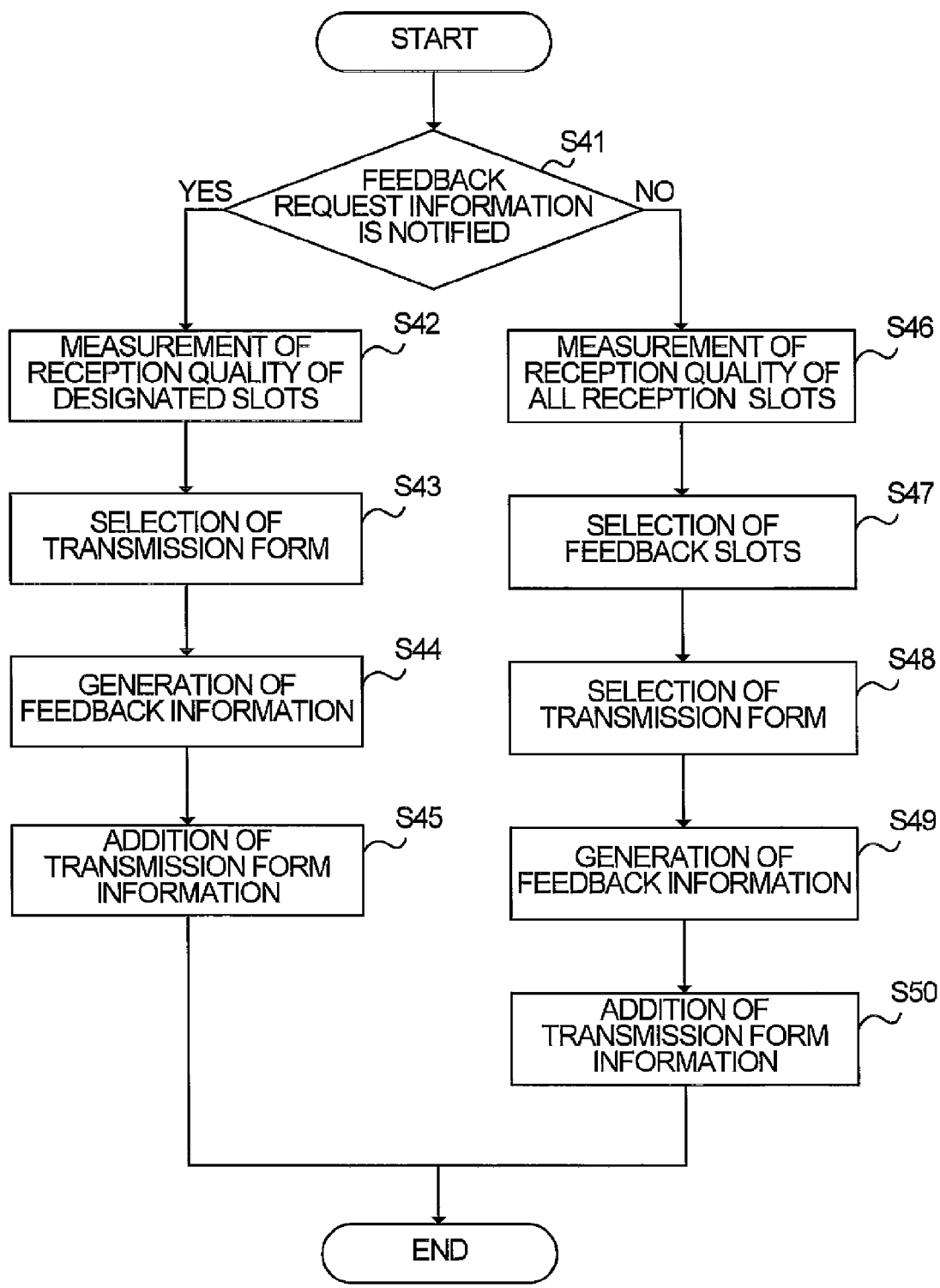
FIG. 9 is a diagram showing an example of the operation of generating feedback information in the communication terminal apparatus of the second embodiment.

Next, the transmission form selecting section 215 of the communication terminal apparatus 200 selects one transmission from a plurality of transmission forms based on the reception quality measurement result measured in the reception quality measuring section 214 (step S33). The feedback information generating section 216 generates the reception quality information based on the reception quality measurement result measured in the reception quality measuring section 214 (step S34). Further, the section 216 generates the transmission form information for designating the transmission form selected in the transmission form selecting section 215, and adds the generated transmission form information to the generated reception quality information to generate the feedback information (step S35). The generated feedback information is notified to the communication control apparatus 100 by uplink radio communication (step S36). More specific operation for the communication terminal apparatus 200 to generate the feedback information will be described below according to the flow diagram as shown in FIG. 9. FIG. 9 is a diagram showing an example of the operation of generating the feedback information in the communication terminal apparatus 200 of this embodiment.

First, the reception quality measuring section 214 of the communication terminal apparatus 200 determines whether feedback request information is notified from the communication control apparatus 100 (step S41). The feedback request information, designated slots included in the feedback request information, and the method of notifying the feedback request information are the same as in the first embodiment. When the feedback request information is notified from the communication control apparatus 100 (YES in step 41), the communication terminal apparatus 200 measures the reception quality on slots (designated slots) in designated positions (step S42).

Next, in the communication terminal apparatus 200, the transmission form selecting section 215 selects one transmission form from a plurality of transmission forms based on the reception quality measurement results of the designated slots measured in the reception quality measuring section 214 (step S43). As in the first embodiment, the transmission form selecting section 215 compares the reception quality measurement result with a predetermined threshold, and is capable of determining whether the reception quality is good. In this embodiment, as in the first embodiment, the multi-user diversity form and frequency diversity form are used as the transmission form.

The transmission form selecting section 215 selects the multi-user diversity form when the propagation path conditions are good, while selecting the frequency diversity effect when the propagation path conditions are poor, or when the moving speed of the communication terminal apparatus 200 is fast and variations in propagation path conditions are intense. The transmission form selecting section 215 may select the multi-user diversity form usually, and when the propagation path conditions are poor, or when the moving speed of the communication terminal apparatus 200 is fast and variations in propagation path conditions are intense, vary the transmission form. By varying the transmission form, radio transmission and reception is performed while using a plurality of slots in the frequency-axis direction in scheduling in the communication control apparatus 100 corresponding to the propagation path conditions, and thereby producing the frequency diversity effect in downlink radio communication.

The feedback information generating section 216 generates the feedback information based on the reception quality measurement result measured in the reception quality measuring section 214 and the transmission form selected in the transmission form selecting section 215 (step S44). The feedback information generating section 216 associates the designated slots respectively with the reception quality measurement results to generate the reception quality information. Further, the section 216 generates the transmission form information for specifying the transmission form to add to the generated reception quality information, and thus generates the feedback information (step S45). In this embodiment, since the transmission form is not notified using the data form to notify the communication control apparatus 100 of the reception quality measurement result, a data form beforehand determined between the communication control apparatus 100 and communication terminal apparatus 200 can be used as the data form of the feedback information. Further, by including the information for designating the data form in the feedback information, the communication terminal apparatus 200 is capable of selecting the data form corresponding to conditions of the reception quality (propagation path conditions). By this means, it is also possible to suppress information amounts of the feedback information. For example, the measurement value form is used that information indicating a slot position of each slot is associated with the propagation path condition information of each slot to generate the feedback information. Alternately, when the propagation path conditions are almost the same among designated slots, and it is not necessary to vary the transmission form (transmission modulation scheme), the average value form is used that an average value is calculated by averaging the reception quality measurement results of all the designated slots, and that the calculated average value and slot numbers of the designated slots are used as the feedback information. When the average value form is used, it is possible to suppress the information amount as compared with the case of using the measurement value form.

Further, the feedback information can be notified by data such as (1) data obtained by quantizing the average measurement value or reception quality measurement result, (2) a modulation parameter (modulation scheme) enabling transmission and reception in propagation path conditions in the average measurement value or information bit representing the scheme, (3) a variation value from propagation path condition data that was measured before notifying the feedback information this time and already notified to the communication control apparatus 100 or information bit obtained by quantizing the variation value, or the like. Further, the communication terminal apparatus 200 may associate the average measurement value with the information (slot numbers) indicating designated slots, information (information indicating the average measurement value, information indicating the data form) indicating the average of a plurality of designated slots, or information (slot numbers) indicating slot numbers used in calculating the average measurement value to generate the feedback information.

Moreover, by designating different transmission forms in the transmission form information between the case where the propagation path conditions are poor in the designated slots, or the moving speed of the communication terminal apparatus 200 is fast and variations in propagation path conditions are intense and the case where the propagation path conditions are not poor, it is possible to notify the communication control apparatus 100 of the propagation path conditions. The transmission form information is also capable of designating a transmission form using a bit. For example, it is possible to designate the multi-user diversity form when the bit is ON"1", or the frequency diversity form when the bit is OFF"0". Further, in the case of three or more transmission forms, it is possible to support the case by increasing bits to represent.

When the feedback request information is not notified from the communication control apparatus 100 (NO in step S41), the reception quality of all the slots is measured (step S46). When the feedback request information is not notified, to reduce measurement amounts and data processing amounts, the communication terminal apparatus 200 is capable of beforehand setting slots to measure propagation path conditions. Based on the reception quality measurement results of all the measured slots, the reception quality measuring section 214 selects slots to notify the communication control apparatus 100 of the reception quality information i.e. slots (feedback slots, selected slots) to include the reception quality measurement results in the feedback information (step S47). The reception quality measuring section 214 can select slots for feedback as in the first embodiment.

The reception quality measuring section 214 notifies the transmission form selecting section 215 of slots numbers of measured feedback slots, and the reception quality measurement results. Further, when slots to measure propagation path conditions are beforehand set, the reception quality measuring section 214 may select feedback slots from among a plurality of slots of which reception quality is measured, or may notify about all the selected slots to the transmission form selecting section 215. Alternately, feedback slots may be all the measured slots.

The transmission form selecting section 215 selects one transmission from a plurality of transmission forms based on the reception quality measurement results of the slots (feedback slots) selected in the reception quality measuring section 214 (step S48). The transmission form is the same as described previously.

The feedback information generating section 216 generates the feedback information based on the reception quality measurement results measured by the reception quality measuring section 214 and the transmission form selected by the transmission form selecting section 215 (step S49). When the reception quality measurement results of all the feedback slots are notified, the reception quality measurement results of the feedback slots are associated with the information (slot numbers) indicating respective positions of the slots.

Meanwhile, as in step S44 as described previously, when the propagation path conditions are almost the same among slots for feedback of the information and it is not necessary to vary the transmission modulation scheme, the average measurement result obtained by averaging reception quality measurement results of a plurality of slots is associated with information indicating slot positions used in averaging. Further, the reception quality information is generated as in step S44, the transmission form information for designating the transmission form is generated to be added to the reception quality information, and the feedback information is generated (step S50).

Described next is the operation of the communication control apparatus 100 receiving the feedback information transmitted from each communication terminal apparatus 200, with reference to FIG. 8. The communication control apparatus 100 receives the feedback information, and the transmission form determining section 101 determines the transmission form to each communication terminal apparatus 200 by the transmission form information added to the feedback information (step S37). In an example where a bit is added as the transmission form information, the section 101 determines the transmission form by whether the bit is ON"1" or OFF"0". As the transmission form to select, in this embodiment, either the multi-user diversity form or the frequency diversity form is selected. Specific examples of the transmission form are the same as described in the first embodiment with reference to FIGS. 5 to 7.

The communication control apparatus 100 selects a transmission form corresponding to the transmission foam information notified from each communication terminal apparatus 200, assigns the transmission data of each communication terminal apparatus to a slot (step S38), and performs downlink radio transmission (step S39). Feedback intervals at which the communication control apparatus acquires the feedback information from the communication terminal apparatus 200 are the same as the duration of a slot length in the shortest interval. The communication control apparatus 100 is capable of performing slot allocation at the same intervals as the feedback intervals. On the other hand, to simplify and reduce operating power, the communication control apparatus 100 does not need to always perform slot allocation at the same intervals as the feedback intervals.

Thus, in this embodiment, each communication terminal apparatus measures the reception quality (propagation path conditions), adds the additional information to notify in transmitting the feedback to the communication control apparatus, and is thereby capable of notifying the transmission form information for designating a transmission form. The communication control apparatus is thereby capable of selecting a suitable transmission form for each communication terminal apparatus. Further, each communication terminal apparatus determines a transmission form of data to be transmitted from the communication control apparatus, and is thereby capable of reducing the processing of the communication control apparatus. Furthermore, as in the first embodiment, since the feedback information transmitted from each communication terminal apparatus does not need to always include all the propagation path conditions, it is also possible to reduce transmission power of the communication terminal apparatus. The information of the suitable transmission form is transmitted from each communication terminal apparatus as feedback, and the communication control apparatus is thereby capable of performing more efficient data assignments.

Each of the embodiments as described above is explained based on the premise that the wireless communication system uses one-cell reuse OFDM/(TDMA, FDMA) communication scheme. However, the present invention is applicable to wireless communication systems using a plurality of transmission forms to assign data to slots between communication apparatuses for transmitting data while assigning the data to a plurality of slots each specified by one or more time channels each defined by a predetermined time length, and one or more frequency channels each defined by a predetermined frequency band.

The invention claimed is:

1. A communication terminal apparatus that communicates with a communication control apparatus using a plurality of slots each specified by one or more time channels each defined by a predetermined time length, and one or more frequency channels each defined by a predetermined frequency band, comprising:
   a terminal-side receiving section that receives control information from the communication control apparatus;
   a reception quality measuring section that measures reception quality of a plurality of slots using the received control information;
   a transmission form selecting section that selects a single transmission form from among a plurality of transmission forms to assign data transmitted from the communications control apparatus to the plurality of slots, based on a measurement result of measured reception quality;
   a feedback information generating section that generates feedback information and edits the measurement result of measured reception quality into a data form, based on the selected transmission form, to generate the reception quality information for notifying the communication control apparatus of reception quality information indicating the reception quality in a plurality of slots and transmission form information for designating a selected transmission form; and
   a terminal-side transmitting section that transmits the generated feedback information to the communication control apparatus,
   wherein the terminal-side receiving section receives data of the transmission form designated in the transmission form information from the communication control apparatus.

2. The communication terminal apparatus according to claim 1, wherein the feedback information generating section sets a plurality of different data forms corresponding to the plurality of transmission forms, selects a data form corresponding to the selected transmission form, and uses the generated reception quality information as the feedback information.

3. The communication terminal apparatus according to claim 2, wherein the feedback information generating section calculates an average measurement result obtained by averaging measurement results of reception quality of a plurality of slots, uses the calculated average measurement result as the feedback information, and thereby generates the feedback information for notifying the reception quality information and the transmission form information for designating a first transmission form.

4. The communication terminal apparatus according to claim 2, wherein the feedback information generating section uses respective measurement results of reception quality of a plurality of slots as the feedback information, and thereby generates the feedback information for notifying the reception quality information and the transmission form information for designating a second transmission form.

5. The communication terminal apparatus according to claim 1, wherein the feedback information generating section generates the reception quality information based on the measurement result of measured reception quality, and generates the feedback information including the generated reception quality information and the transmission form information.

6. The communication terminal apparatus according to claim 1, wherein the terminal-side receiving section receives the control information including feedback request information for designating a slot,
   the reception quality measuring section measures the reception quality of the slot designated in the feedback request information, and
   the feedback information generating section generates the reception quality information based on the measurement result of reception quality of the designated slot.

7. The communication terminal apparatus according to claim 1, wherein the reception quality measuring section selects a predetermined number of slots from among a plurality of slots as feedback slots, and measures the reception quality of selected feedback slots, and
   the feedback information generating section generates the reception quality information based on measurement results of the reception quality of the feedback slots.

8. The communication terminal apparatus according to claim 1, wherein the reception quality measuring section selects a predetermined number of slots from measurement results of measured reception quality of a plurality of slots as feedback slots,
   the transmission form selecting section selects a single transmission form from among a plurality of transmission forms based on measurement results of reception quality of selected feedback slots, and the feedback information generating section generates the reception quality information based on the measurement results of reception quality of the feedback slots.

9. The communication terminal apparatus according to claim 8, wherein the reception quality measuring section selects a predetermined number of slots in descending order of excellence of the reception quality as feedback slots.

10. The communication terminal apparatus according to claim 8, wherein the reception quality measuring section selects a predetermined number of slots in descending order of excellence of the reception quality, and further selects a predetermined number of slots in ascending order of excellence of the reception quality, as feedback slots.

11. The communication terminal apparatus according to claim 1, wherein the reception quality measuring section uses at least one of propagation path quality calculated from reception signal power and carrier signal power, and reception data quality calculated from an error amount of the reception data.

12. The communication terminal apparatus according to claim 1, wherein the reception quality measuring section measures the reception quality of the same slot at a plurality of points in time, and determines moving speed of the communication terminal apparatus based on the measured reception quality at the plurality of points in time.

13. The communication terminal apparatus according to claim 1, wherein the plurality of transmission forms includes at least one of a multi-user diversity scheme for assigning communication terminal apparatuses with good propagation path conditions for each slot, and a frequency diversity scheme for using a plurality of slots in the frequency direction and transmitting to obtain a diversity effect.

14. A communication control apparatus that communicates with a plurality of communication terminal apparatuses using a plurality of transmission forms for assigning data to a plurality of slots each specified by one or more time channels each defined by a predetermined time length, and one or more frequency channels each defined by a predetermined frequency band, comprising:
   a control-side transmitting section that transmits control information to the communication terminal apparatuses;
   a control-side receiving section that receives the reception quality information edited using one of a plurality of different data forms as feedback information for notifying reception quality information indicating reception quality and transmission form information for designating a single transmission form among the plurality of transmission forms, in response to the control information;
   a transmission form determining section that selects a transmission form to apply to the communication terminal apparatuses based on the received feedback information; and
   a data assigning section that assigns data of which transmission destinations are the communication terminal apparatuses to respective slots based on the selected transmission form and the reception quality information,
   wherein the control-side transmitting section transmits the data of which transmission destinations are the communication terminal apparatuses assigned to respective slots, using the selected transmission form.

15. The communication control apparatus according to claim 14, wherein the transmission form determining section selects a single transmission form from among the plurality of transmission forms based on the data form indicated by the reception quality information.

16. The communication control apparatus according to claim 15, wherein the transmission form determining section selects a first transmission form when the reception quality information is an average measurement result obtained by averaging measurement results of reception quality of a plurality of slots.

17. The communication control apparatus according to claim 15, wherein the transmission form determining section selects a second transmission form when the reception quality information is respective measurement results of reception quality of a plurality of slots.

18. The communication control apparatus according to claim 14, wherein the control-side receiving section receives feedback information including the transmission form information for designating one of the plurality of transmission forms, and
   the transmission form determining section selects a single transmission form from among the plurality of transmission forms based on the transmission form information included in the feedback information.

19. The communication control apparatus according to claim 14, wherein the control-side transmitting section transmits the control information including feedback request information for designating a slot position to request measurement of the reception quality,
   the control-side receiving receives feedback information for notifying the reception quality information in the slot position designated in the feedback request information and the transmission form information, and the data assigning section assigns data of which transmission destinations are the communication terminal apparatuses to respective slots based on the reception quality information in the designated slot position and the selected transmission form.

20. The communication control apparatus according to claim 14, wherein the control-side receiving section receives feedback information for notifying the reception quality information in selected feedback slots such that each of the communication terminal apparatuses selects a predetermined number of slots from among a plurality of slots as feedback slots, and the transmission form information, and
   the data assigning section assigns data of which transmission destinations are the communication terminal apparatuses to respective slots based on the reception quality information in the feedback slots and the selected transmission form.

21. The communication control apparatus according to claim 14, wherein the plurality of transmission forms includes at least one of a multi-user diversity scheme for assigning communication terminal apparatuses with good propagation path conditions for each slot, and a frequency diversity scheme for using a plurality of slots in the frequency direction and transmitting to obtain a diversity effect.

22. A wireless communication system in which a communication control apparatus communicates with a communication terminal apparatus using a plurality of slots each specified by one or more time channels each defined by a predetermined time length, and one or more frequency channels each defined by a predetermined frequency band, wherein the communication terminal apparatus has a terminal-side receiving section that receives control information from the communication control apparatus,
   a reception quality measuring section that measures reception quality of a plurality of slots using the received control information,
   a transmission form selecting section that selects a single transmission form from among a plurality of transmission forms to assign data transmitted from the communications control apparatus to the plurality of slots based on a measurement result of measured reception quality, a feedback information generating section that generates feedback information for notifying the communication control apparatus of reception quality information indicating the reception quality in a plurality of slots, and transmission form information for designating a selected transmission form, and a terminal-side transmitting section that transmits the generated feedback information to the communication control apparatus, and the communication control apparatus has a control-side transmitting section that transmits the control information to the communication terminal apparatus, a control-side receiving section that receives the feedback information from the communication terminal apparatus in response to the control information, a transmission form determining section that selects a transmission form to apply to the communication terminal apparatus based on the received feedback information, and a data assigning section that assigns data of which transmission destination is the communication terminal apparatus to each slot based on the selected transmission form and the reception quality information, wherein the control-side transmitting section transmits the data of which transmission destination is each communication terminal apparatus assigned to each slot, using the selected transmission form, and the terminal-side receiving section receives the data of the transmission form designated in the transmission form information from the communication control apparatus.

23. A communication method of a communication terminal apparatus that communicates with a communication control apparatus using a plurality of slots each specified by one or more time channels each defined by a predetermined time length, and one or more frequency channels each defined by a predetermined frequency band, comprising:

receiving control information from the communication control apparatus;

measuring reception quality of a plurality of slots using the received control information;

selecting a single transmission form from among a plurality of transmission forms to assign data transmitted from the communications control apparatus to the plurality of slots based on a measurement result of measured reception quality;

generating feedback information and edits the measurement result of measured reception quality into a data form, based on the selected transmission form, to generate the reception quality information for notifying the communication control apparatus of reception quality information indicating the reception quality in a plurality of slots, and transmission form information for designating a selected transmission form;

transmitting the generated feedback information to the communication control apparatus; and receiving data of the transmission form designated in the transmission form information from the communication control apparatus.

24. A communication method of a communication control apparatus that communicates with a plurality of communication terminal apparatuses using a plurality of transmission forms for assigning data to a plurality of slots each specified by one or more time channels each defined by a predetermined time length, and one or more frequency channels each defined by a predetermined frequency band, comprising:

transmitting control information to the communication terminal apparatuses;

receiving the reception quality information edited using one of a plurality of different data forms as feedback information for notifying reception quality information indicating reception quality and transmission form information for designating a single transmission form among the plurality of transmission forms, in response to the control information;

selecting a transmission form to apply to the communication terminal apparatuses based on the received feedback information;

assigning data of which transmission destinations are the communication terminal apparatuses to respective slots based on the selected transmission form and the reception quality information; and transmitting the data of which transmission destinations are the communication terminal apparatuses assigned to respective slots, using the selected transmission form.

25. A communication method in a wireless communication system in which a communication control apparatus communicates with a communication terminal apparatus using a plurality of slots each specified by one or more time channels each defined by a predetermined time length, and one or more frequency channels each defined by a predetermined frequency band, wherein the communication terminal apparatus receives control information from the communication control apparatus, measures reception quality of a plurality of slots using the received control information, selects a single transmission form from among a plurality of transmission forms to assign data transmitted from the communications control apparatus to the plurality of slots based on a measurement result of measured reception quality, generates feedback information for notifying the communication control apparatus of reception quality information indicating the reception quality in a plurality of slots, and transmission form information for designating a selected transmission form, and transmits the generated feedback information to the communication control apparatus, and the communication control apparatus transmits the control information to the communication terminal apparatus, receives the feedback information from the communication terminal apparatus in response to the control information, selects a transmission form to apply to the communication terminal apparatus based on the received feedback information, and assigns data of which transmission destination is the communication terminal apparatus to each slot based on the selected transmission form and the reception quality information, wherein the communication control apparatus transmits the data of which transmission destination is each communication terminal apparatus assigned to each slot using the selected transmission form, and the communication terminal apparatus receives the data of the transmission form designated in the transmission form information from the communication control apparatus.

26. The wireless communication system according to claim 22, wherein the feedback information generating section generates the feedback information using, as the reception quality information, either an average measurement result calculated from the average measurement result obtained by averaging measurement results of reception quality of a plurality of slots or the measurement results respectively of reception quality of the plurality of slots, and the transmission form determining section selects a frequency diversity scheme as a transmission form when the feedback information is the average measurement result, while selecting a multi-user diversity scheme as a transmission form when the feedback information is the measurement value results.

\* \* \* \* \*